United States Patent
Guo et al.

(10) Patent No.: US 11,546,806 B2
(45) Date of Patent: Jan. 3, 2023

(54) COMMUNICATION SYSTEM

(71) Applicant: NEC CORPORATION, Tokyo (JP)

(72) Inventors: Tao Guo, Tokyo (JP); Alberto Suarez, Tokyo (JP)

(73) Assignee: NEC CORPORATION, Tokyo (JP)

( * ) Notice: Subject to any disclaimer, the term of this patent is extended or adjusted under 35 U.S.C. 154(b) by 193 days.

(21) Appl. No.: 17/056,047

(22) PCT Filed: May 27, 2019

(86) PCT No.: PCT/JP2019/020929
§ 371 (c)(1),
(2) Date: Nov. 17, 2020

(87) PCT Pub. No.: WO2019/230659
PCT Pub. Date: Dec. 5, 2019

(65) Prior Publication Data
US 2021/0211942 A1      Jul. 8, 2021

(30) Foreign Application Priority Data
May 31, 2018   (GB) ..................................... 1808953

(51) Int. Cl.
*H04W 28/26*     (2009.01)
*H04L 41/5067*   (2022.01)
(Continued)

(52) U.S. Cl.
CPC ......... *H04W 28/26* (2013.01); *H04L 41/5067* (2013.01); *H04W 28/24* (2013.01); *H04W 72/087* (2013.01)

(58) Field of Classification Search
None
See application file for complete search history.

(56) References Cited

U.S. PATENT DOCUMENTS

2019/0281503 A1   9/2019   Xu et al.
2020/0029242 A1*  1/2020   Andrews .......... H04W 28/0268
(Continued)

FOREIGN PATENT DOCUMENTS

KR   10-2017-0111246 A   10/2017
WO      2016/209311 A1   12/2016
(Continued)

OTHER PUBLICATIONS

Next Generation Mobile Networks (NGMN) Alliance, "NGMN 5G White Paper", Feb. 17, 2015, 125pages.
(Continued)

*Primary Examiner* — Robert M Morlan
(74) *Attorney, Agent, or Firm* — Sughrue Mion, PLLC

(57) ABSTRACT

A communication system is disclosed in which communication resources are dynamically partitioned into a plurality of slices, each slice having at least one associated network-level performance requirement. A network-level performance requirement is translated into cell-level resource requirement(s) for determining, based on the cell-level resource requirement(s), whether to admit a slice instance. When the slice instance is admitted, information identifying the cell-level resource requirement(s) for the slice instance is provided to a scheduler function. The cell-level resource requirement(s) for a given slice instance may be used to determine an associated packet delivery deadline and entitled resource amount before deadline. The scheduler function allocates communication resources to each admitted slice based on an earliest-deadline-first method.

32 Claims, 14 Drawing Sheets

(51) Int. Cl.
*H04W 72/08* (2009.01)
*H04W 28/24* (2009.01)

(56) References Cited

U.S. PATENT DOCUMENTS

| 2020/0252908 | A1  | 8/2020 | Liu et al. |           |
|--------------|-----|--------|------------|-----------|
| 2021/0037544 | A1* | 2/2021 | Andrews    | H04L 47/808 |
| 2021/0084523 | A1* | 3/2021 | Kucera     | H04W 28/06 |

FOREIGN PATENT DOCUMENTS

| WO | 2018/094667 A1 | 5/2018 |
| WO | 2018/134684 A1 | 7/2018 |
| WO | 2018/134911 A1 | 7/2018 |

OTHER PUBLICATIONS

"3rd Generation Partnership Project; Technical Specification Group Service and System Aspects; Service requirements for Machine-Type Communications(MTC); Stage 1(Release 13)", 3GPP TS 22.368 V13.1.0, Dec. 2014, 26pages.

"IMT Vision-Framework and overall objectives of the future development of IMT for 2020 and beyond", Recommendation ITU-R M. 2083-0, Sep. 2015, 21 pages.

"3rd Generation Partnership Project; Technical Specification Group Service and System Aspects; Telecommunication management; Study on management and orchestration of network slicing for next generation network (Release 15)", 3GPP TR 28.801 V15.1.0, Jan. 2018, 75 pages.

Ravi Kokku et al., "NVS: A virtualization substrate for WiMAX Networks", in Proc. of ACM Mobile Comp. and Netw. (Mobicom), Chicago, USA, Sep. 2010, 12pages.

Tao Guo et al., "Active LTE RAN Sharing with Partial Resource Reservation", in Proc. of IEEE Veh. Tech. Conf. (VTC), Las Vegas, USA, Sep. 2013, 5 pages.

"3rd Generation Partnership Project; Technical Specification Group Radio Access Network; Study on New Radio Access Technology Physical Layer Aspects(Release 14)", 3GPP TR 38.802 V14.2.0, Sep. 2017, 144 pages.

"Deadline Task Scheduling", https://www.kernel.org/doc/Documentation/scheduler/sched-deadline.txt, 11 pages, Mar. 17, 2016(Internet Archive).

J. A. Stankovic et al., "Fundamentals of EDF scheduling", Deadline Scheduling for Real-Time Systems, Springer, 1998, pp. 27-65, vol. 460.

Luca Abeni et al., "Integrating Multimedia Applications in Hard Real-Time Systems", Proc. Of IEEE Real-Time Sys. Symp. (RTSS), Dec. 1998, 10 pages.

"3rd Generation Partnership Project; Technical Specification Group Radio Access Network; Evolved Universal Terrestrial Radio Access (E-UTRA); Further advancements for E-UTRA physical layer aspects (Release 9)", 3GPP TR 36.814 V9.2.0, Mar. 2017, 105 pages.

Vincenzo Sciancalepore et al., "Mobile Traffic Forecasting for Maximizing 5G Network Slicing Resource Utilization", IEEE Conference on Computer Communications, May 1, 2017, pp. 1-9.

Adlen Ksentini et al., "Toward Enforcing Network Slicing on RAN: Flexibility and Resources Abstraction", IEEE Communications Magazine, Jun. 13, 2017 pp. 102-108, vol. 55, No. 6.

United Kingdom Search Report for GB1808953 dated Nov. 1, 2018.
International Search Report for PCT/JP2019/020929 dated Oct. 18, 2019 [PCT/ISA/210].
Written Opinion for PCT/JP2019/020929 dated Oct. 18, 2019 [PCT/ISA/237].

* cited by examiner

COMMUNICATION SYSTEM

CROSS REFERENCE TO RELATED APPLICATIONS

This application is a National Stage of International Application No. PCT/JP2019/020929 filed May 27, 2019, claiming priority based on United Kingdom Patent Application No. 1808953.2 filed May 31, 2018.

TECHNICAL FIELD

The present invention relates to mobile communications devices and networks, particularly but not exclusively those operating according to the 3rd Generation Partnership Project (3GPP) standards or equivalents or derivatives thereof. The invention has particular although not exclusive relevance to network slicing and associated scheduling in the so-called '5G' (or 'Next Generation') systems.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN), also commonly referred as '4G'. In addition, the term '5G' and 'new radio' (NR) refer to an evolving communication technology that is expected to support a variety of applications and services such as Machine Type Communications (MTC), Internet of Things (IoT) communications, vehicular communications and autonomous cars, high resolution video streaming, smart city services, and/or the like. Accordingly, 5G technologies are expected to enable network access to vertical markets and support network (RAN) sharing for offering networking services to third parties and for creating new business opportunities. 3GPP intends to support 5G by way of the so-called 3GPP Next Generation (NextGen) radio access network (RAN) and the 3GPP NextGen core (NGC) network.

The next-generation mobile networks must support diversified service requirements, which have been classified into three categories by the International Telecommunication Union (ITU) [1]: Enhanced Mobile Broadband (eMBB), Ultra-Reliable and Low-Latency Communications (uRLLC) and Massive Machine Type Communications (mMTC). eMBB aims to provide enhanced support of conventional MBB, with focuses on services requiring large and guaranteed bandwidth such as High Definition (HD) video, Virtual Reality (VR) and Augmented Reality (AR); uRLLC is a requirement for critical applications such as automated driving and factory automation, which require guaranteed access within a very short time; mMTC needs to support massive number of connected devices such as smart metering and environment monitoring but can usually tolerate certain access delay. It will be appreciated that some of these applications may have relatively lenient Quality of Service/Quality of Experience (QoS/QoE) requirements, while some applications may have relatively stringent QoS/QoE requirements (e.g. high bandwidth and/or low latency).

As it would be expensive and infeasible to deploy dedicated network infrastructure for each service or application type, network slicing (or network virtualisation) is envisaged as a key enabler to support above diversified service requirements in the 5G ecosystem by dynamically partitioning physical network infrastructure into logical networks, referred as network slices, to meet certain network characteristics [2]. Effectively, a network slice can be regarded a logical network for a specific tenant. Various details of 5G networks and network slicing are described in, for example, the 'NGMN 5G White Paper' V1.0 by the Next Generation Mobile Networks (NGMN) Alliance, which document is available from https://www.ngmn.org/5g-white-paper.html.

SUMMARY OF INVENTION

To maximise the revenue of Network Operator, a network slice shall be offered by the Network Operator to a Communication Service Provider (referred to as a tenant) on demand and multiple slices may share the physical network infrastructure in an efficient way. Therefore, the main objective of enabling mechanism for network slicing is to maximise the network resource utilisation/revenue while satisfying the Service Level Agreement (SLA) associated with each admitted slice.

A network slice may include both a Radio Access Network (RAN) part and a Core Network (CN) part to support end-to-end service requirements. Whereas CN slicing can be controlled in a relatively precise way given fixed and relatively large link bandwidth, RAN slicing faces additional challenges due to the limited and fluctuating radio channels. Efficient scheduling and Admission Control (AC) mechanism are necessary to realise the above objective of network slicing in RAN part. Previously, a Network Virtualisation Substrate (NVS) slice scheduler and a corresponding AC mechanism have been proposed for 4G networks. However, this scheme cannot fulfil the new requirements in 5G era due to the following limitations: (1) does not consider slice-specific latency requirements, only allocating a certain fraction of resources to each slice and only as an average over the long term; (2) supports only rough resource share ratios; (3) does not have self-optimisation mechanism such that the resource allocation can adapt to the traffic load and radio environment of each slice.

The inventors realised that, from the perspective of Radio Resource Management (RRM), one or more of the following requirements may need to be fulfilled for RAN slicing:

A slice may be dynamically created, removed, or modified.

The coverage of a slice may be very different. For example, an uRLLC slice may be limited to a confined area whereas an mMTC slice may span a wide area.

A slice may have multiple service instances requesting guaranteed and/or non-guaranteed performances. For example, an eMBB slice may require guaranteed performance for video streaming and non-guaranteed performance for web-browsing and File Transfer Protocol (FTP).

The performance requirements in terms of throughput, latency, reliability, accessibility and etc. may be very different. Customisation for these parameters shall be supported.

The guaranteed performance of a slice shall not be affected by the conditions of other slices with the same or lower priorities.

It shall be possible for a tenant (slice owner) to apply customised admission and scheduling policies for guaranteed resources.

The overall (weighted) resource utilisation or revenue shall be maximised from a network operator's perspective.

The present invention seeks to provide methods and associated apparatus that support or improve upon the provision of network slices and associated scheduling in an efficient and effective manner, whilst also meeting the above mentioned requirements.

Although for efficiency of understanding for those of skill in the art, the invention will be described in detail in the context of a 3GPP system (5G networks), the principles of the invention can be applied to other systems in which slice scheduling is performed.

One example aspect of the present invention provides a first method performed by network apparatus for a communication network in which communication resources are dynamically partitioned into a plurality of slices, each slice having at least one associated network-level performance requirement, the method comprising: receiving a request comprising information from which at least one network-level performance requirement can be identified for a slice instance to which the request relates; translating, from the at least one network-level performance requirement for the slice instance, to at least one associated cell-level resource requirement; determining whether to admit the slice instance based on the at least one cell-level resource requirement translated from the associated at least one network-level performance requirement; and when the determination is to admit the slice instance, providing, to a scheduler function, information identifying at least one cell-level resource requirement for the slice instance to be admitted.

One example aspect of the present invention also provides a second method performed by network apparatus for a communication network in which communication resources are dynamically partitioned into a plurality of slices, the method comprising: determining, for each of a plurality of slice instances, a respective deadline for delivery of a data packet, based on at least one cell-level resource requirement associated with that slice instance, wherein the at least one cell-level resource requirement is based on at least one network-level performance requirement associated with that slice instance; and allocating communication resources to the slice instances in order of their respective deadlines, starting from the slice instance having the earliest deadline.

Example aspects of the invention extend to corresponding systems, apparatus, and computer program products such as computer readable storage media having instructions stored thereon which are operable to program a programmable processor to carry out a method as described in the example aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Example embodiments of the invention will now be described, by way of example, with reference to the accompanying drawings in which.

DESCRIPTION OF EMBODIMENTS

Overview

Under the 3GPP standards, a NodeB (or an 'eNB' in LTE, 'gNB' in 5G) is a base station via which communication devices (user equipment or 'UE') connect to a core network and communicate to other communication devices or remote servers. Communication devices might be, for example, mobile communication devices such as mobile telephones, smartphones, smart watches, personal digital assistants, laptop/tablet computers, web browsers, e-book readers, and/or the like. Such mobile (or even generally stationary) devices are typically operated by a user (and hence they are often collectively referred to as user equipment, 'UE') although it is also possible to connect IoT devices and similar MTC devices to the network. For simplicity, the present application will use the term base station to refer to any such base stations and use the term mobile device or UE to refer to any such communication device.

Figure 1:
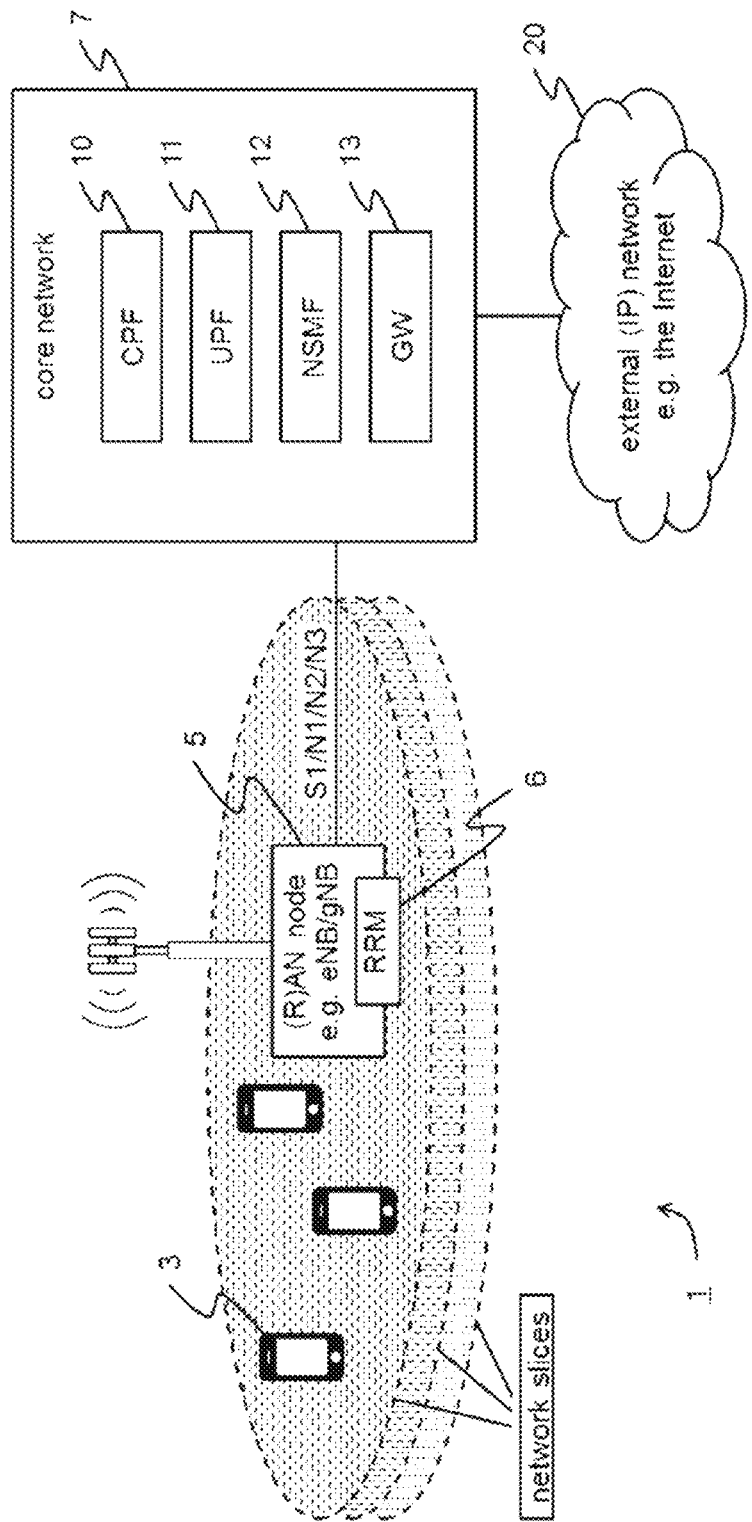
FIG. 1 illustrates schematically a mobile (cellular or wireless) telecommunication system to which example embodiments of the invention may be applied.

FIG. 1 illustrates schematically a mobile (cellular or wireless) telecommunication system 1 to which example embodiments of the invention may be applied.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst three mobile devices 3 and one base station 5 are shown in FIG. 1 for illustration purposes, the system, when implemented, will typically include other base stations and mobile devices (UEs).

Each base station 5 controls one or more associated cells (either directly or via other nodes such as home base stations, relays, remote radio heads, and/or the like). A base station 5 that supports E-UTRA/4G protocols may be referred to as an 'eNB' and a base station 5 that supports NextGeneration/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like).

The core network 7 (e.g. the EPC in case of LTE or the NGC in case of NR/5G) typically includes logical nodes (or 'functions') for supporting communication in the telecommunication system 1, and for subscriber management, mobility management, charging, security, call/session management (amongst others). For example, the core network 7 of a 'Next Generation'/5G system will include, amongst other functions, control plane functions (CPFs) 10 and user plane functions (UPFs) 11. It will be appreciated that a CPF 10 may be configured to provide one or more of the following: an Access and Mobility Function (AMF), a Policy Control Function (PCF), an Operations and Maintenance (OAM) function, an Application Function (AF) and/or a Network Function (NF), amongst others.

The system 1 is configured to support multiple tenants and multiple services, using associated network slices. In other words, the (R)AN (in this example the base station 5) and, optionally, the core network 7 may be shared among a plurality of tenants. Each tenant has an associated SLA with the network operator (or with at least one of the network operators if the network is shared) for the provision of communication services such as voice calls, video calls, text/multimedia messaging, mobile broadband, social networking, cloud services, etc. Each service may fall into at least one of the following categories: Enhanced Mobile Broadband (eMBB), Ultra-Reliable and Low-Latency Communications (uRLLC), and Massive Machine Type Communications (mMTC).

In this example, the core network 7 includes a Network Slice Management Function (NSMF) 12 (or Network Slice Subnet Management Function, NSSMF) and one or more gateways 13. From the core network 7, connection to an external IP network 20 (such as the Internet) is also provided.

In this example, the base station 5 includes an associated Radio Resource Management (RRM) functionality (e.g. an associated RRM module 6). It will be appreciated that such RRM functionality/RRM module 6 may be provided by any suitable RAN node or in some cases by a node outside the RAN (e.g. an appropriate core network node). The functionality of the RRM and the NSMF may also be combined and provided by a single apparatus (in the RAN or in the core network).

The components of the system 1 are configured to manage the resources used by each network slice such that the associated SLA is satisfied for each slice. Service instances of a particular slice can be either guaranteed services or non-guaranteed services. Data (i.e. each data packet) has an associated 'deadline' which indicates a point of time by which that particular data packet needs to be delivered in order to meet the requirements (e.g. QoS/QoE) of the service associated with that data (based on the SLA with the tenant providing the service).

The RRM 6 and NSMF 12 provide the following functionalities:

Translation: Network-level performance requirements of each slice are translated into appropriate cell-level resource requirements in terms of number of required resources (e.g. PRBs) per deadline interval.

Admission Control: The Slice Admission Control functionality determines, for each (new or modified) slice request in terms of cell-level resource demands, whether that slice request can be admitted based on the current system resource utilisation and operators' policies (for example, certain type of slices may be given a relatively higher priority than other types of slices). By rejecting certain new/modified slice requests, when appropriate, the base station 5 is able to provide to each admitted slice the necessary amount of resources within the applicable deadline interval.

Self-Optimisation: A functionality to adjust admission control threshold (e.g. based on traffic ratio of guaranteed and non-guaranteed services and operators' policies) and/or a functionality to collect performance indicators from the MAC Scheduler to adjust the parameters used for the translation (e.g. to adapt the number of required resources per deadline interval based on performance management feedback).

Slice Scheduling: Slice scheduling is performed using the so-called Earliest Deadline First method by taking into account the respective deadlines for buffered data packets and available radio resources. An overview of an exemplary EDF Slice Scheduler is given below with reference to FIG. 5. It will be appreciated that the slice scheduler may support one or more of the following procedures: (1) a basic procedure; (2) a replenishing procedure; and (3) an overriding procedure. Further details of these procedures are given in the detailed description below.

Figure 11:
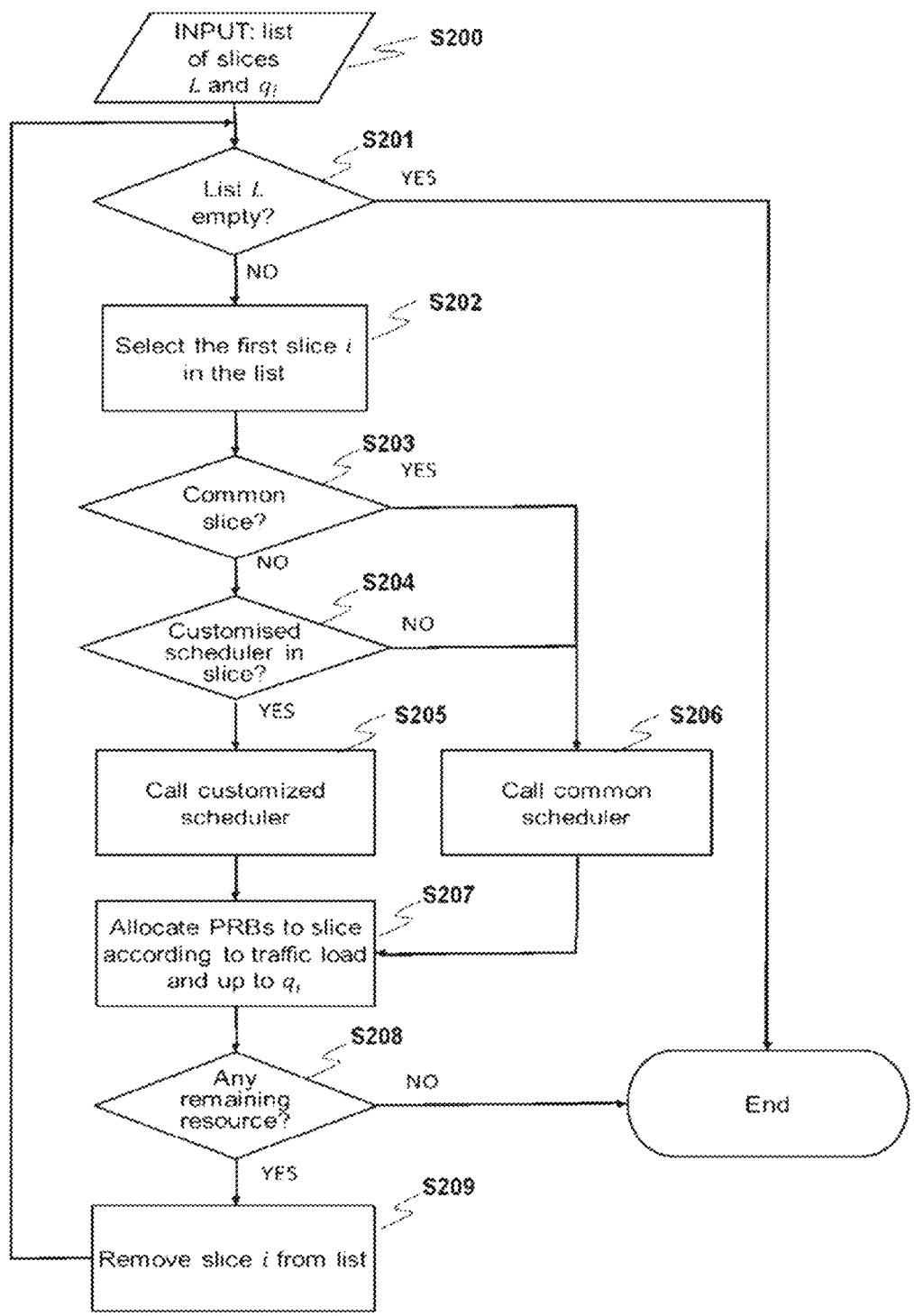
FIG. 11 is a schematic flowchart illustrating an exemplary way in which MAC scheduling may be performed in accordance with an example embodiment of the present invention.

MAC Scheduling: Either a slice specific or a common MAC scheduler may be used. As a general rule, for each slice, retransmissions are prioritised over new transmissions. The operation of an exemplary MAC scheduler is illustrated in FIG. 11.

In summary, this system facilitates efficient 5G RAN slicing in a scenario where multiple types of services are multiplexed into a same carrier bandwidth. Advantageously, the described slice SLA model captures the main characteristics of all three application categories: eMBB, uRLLC, and mMTC. The described exemplary RAN slice scheduler and corresponding AC mechanism support the proposed SLA model while maximising the overall network resource utilisation. The present invention can support hard (delay budget violation is not allowed) and soft (occasional delay budget violation is allowed) radio access latency requirements and can also support guaranteed bit rate via appropriate throughput to resource mapping. It can support unlimited number of slices with arbitrary resource share ratios as long as the system capacity can support. Beneficially, a self-optimisation approach based on SLA violation\measurement feedback facilitates keeping the performance indicators abreast with slice demands.

User Equipment (UE)

Figure 2:
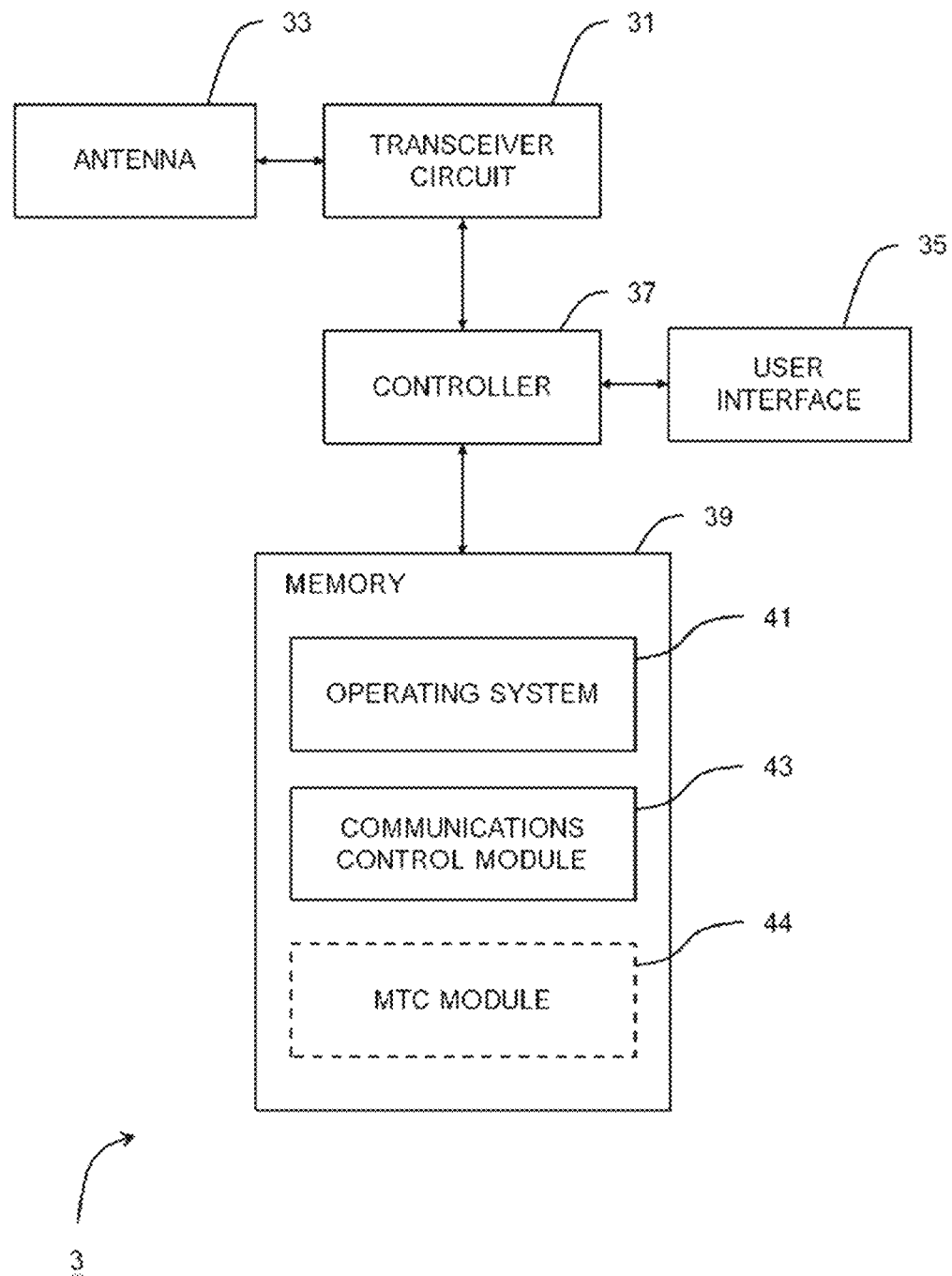
FIG. 2 is a schematic block diagram of a mobile device forming part of the system shown in FIG. 1.

FIG. 2 is a block diagram illustrating the main components of the mobile device (UE) 3 shown in FIG. 1. As shown, the UE 3 includes a transceiver circuit 31 which is operable to transmit signals to and to receive signals from the connected node(s) via one or more antenna 33. Although not necessarily shown in FIG. 2, the UE 3 will of course have all the usual functionality of a conventional mobile device (such as a user interface 35) and this may be provided by any one or any combination of hardware, software and firmware, as appropriate. A controller 37 controls the operation of the UE 3 in accordance with software stored in a memory 39. The software may be pre-installed in the memory 39 and/or may be downloaded via the telecommunication network 1 or from a removable data storage device (RMD), for example. The software includes, among other things, an operating system 41, a communications control module 43, and an (optional) MTC module 44. The communications control module 43 is responsible for handling (generating/sending/receiving) signalling messages and uplink/downlink data packets between the UE 3 and other nodes, including (R)AN nodes 5 and core network nodes. If present, the MTC module 44 handles MTC/IoT type of communications by the UE 3 (e.g. for one or more MTC/IoT application running on the UE 3).

Base Station

Figure 3:
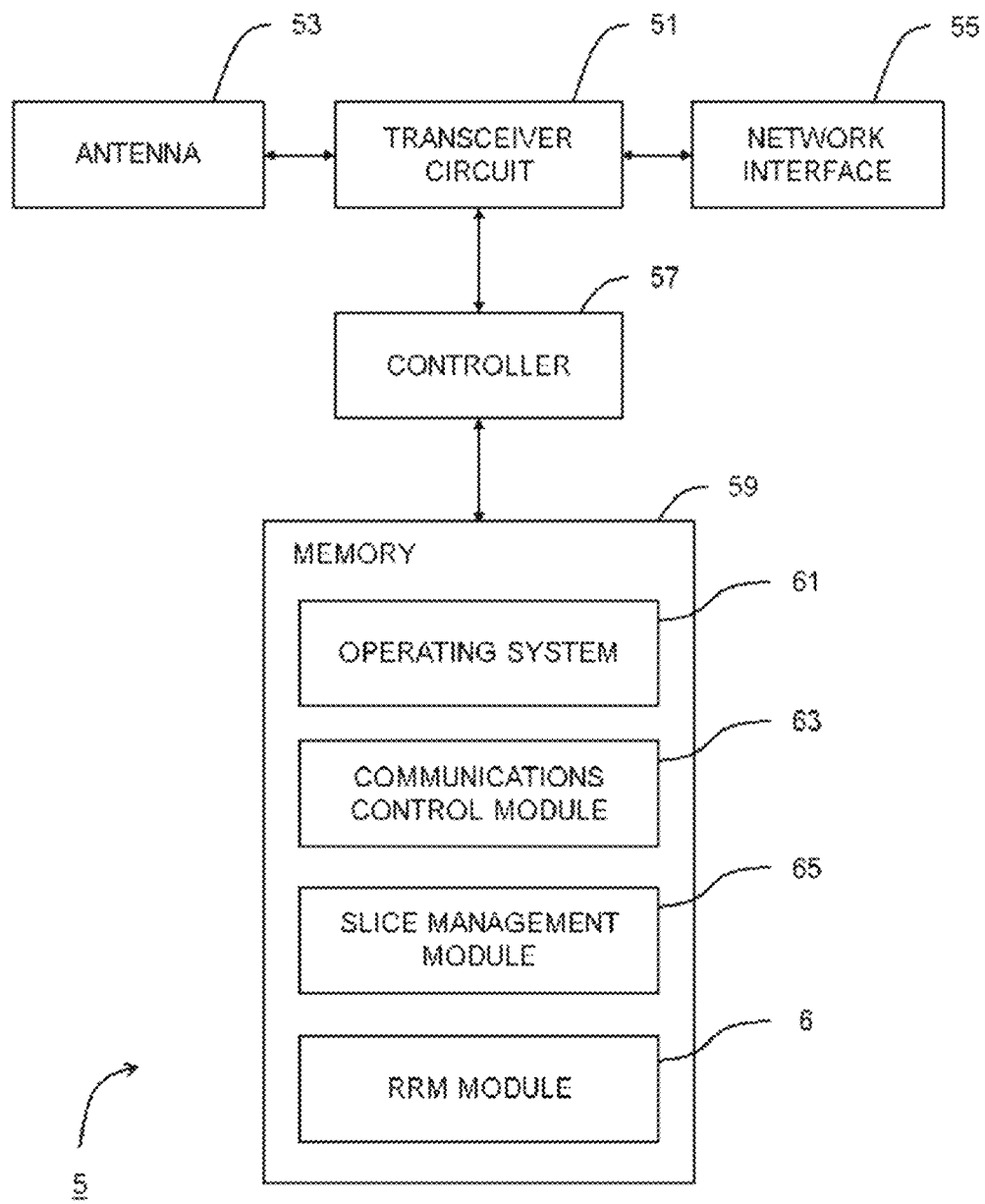
FIG. 3 is a schematic block diagram of a base station forming part of the system shown in FIG. 1.

FIG. 3 is a block diagram illustrating the main components of the base station 5 shown in FIG. 1. As shown, the base station 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station-base station interface (such as X2/Xn) and an appropriate base station-core network interface (such as S1/N1/N2/N3). A controller 57 controls the operation of the base station 5 in accordance with software stored in a memory 59. The software may be pre-installed in the memory 59 and/or may be downloaded via the telecommunication network 1 or from a removable data storage device (RMD), for example. The software includes, among other things, an operating system 61, a communications control module 63, a slice management module 65, and an RRM module 6.

The communications control module 63 is responsible for handling (generating/sending/receiving) signalling between the base station 5 and other nodes, such as the UE 3 and the core network nodes.

The slice management module 65 is responsible for communicating data packets for each UE 3 using a network slice that is appropriate for that UE 3 (e.g. identifying/assigning a network slice to the UE 3 based on an applicable SLA and/or a service being used by the UE 3).

The RRM module 6 is responsible for scheduling data transmissions for each tentant/service currently using the resources of the base station 5 such that the associated SLA can be satisfied. The RRM module 6 may comprise a number of sub-modules, for example, an EDF Scheduler module 93 and a MAC Scheduler module 94, which will be described in detail below.

Network Slice Management Function

Figure 4:
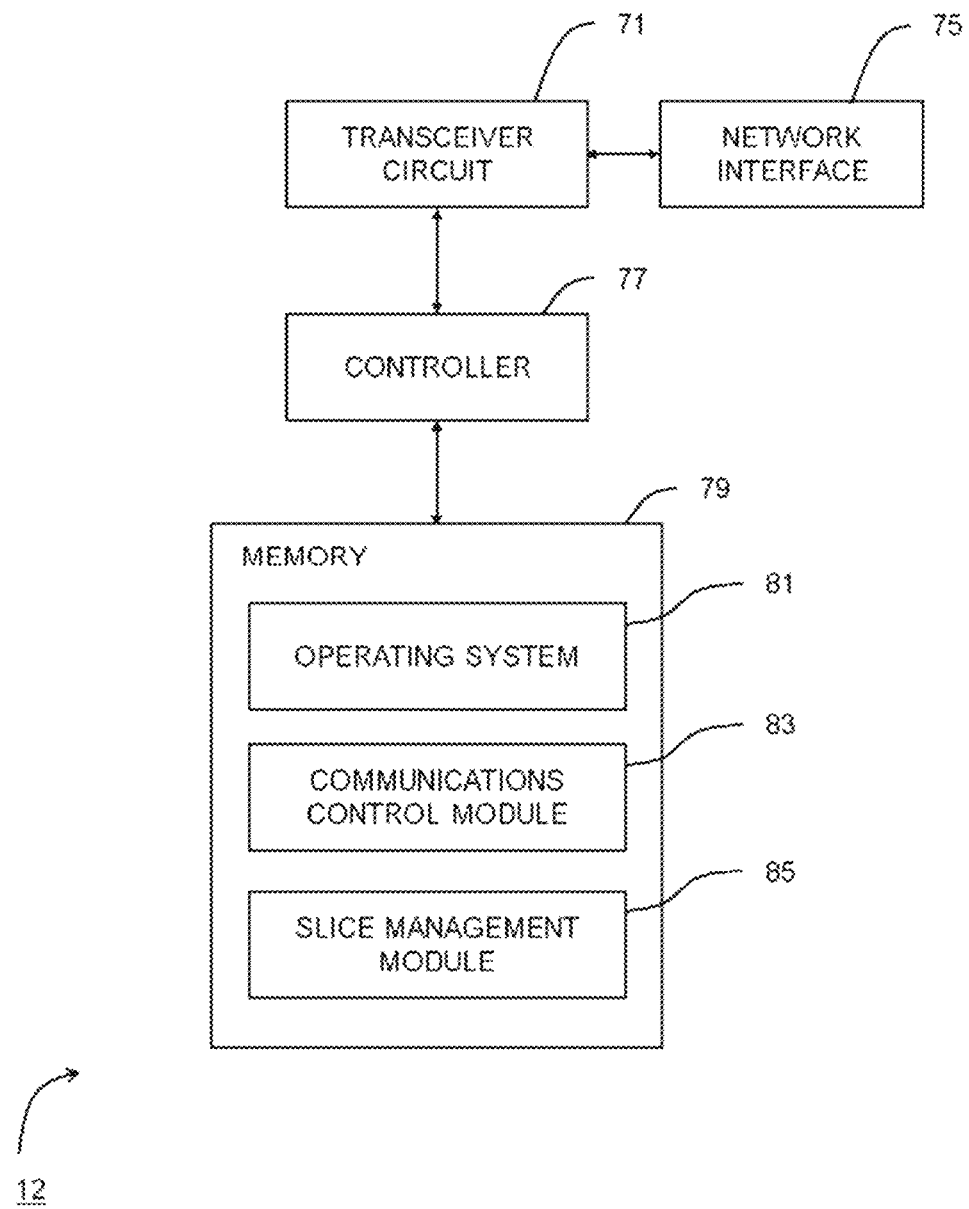
FIG. 4 is a schematic block diagram of a core network node forming part of the system shown in FIG. 1.

FIG. 4 is a block diagram illustrating the main components of a NSMF 12 (or a NSSMF) shown in FIG. 1. As shown, the NSMF 12 includes a transceiver circuit 71 which is operable to transmit signals to and to receive signals from other nodes (including the UE 3, the base station 5, and other core network nodes) via a network interface 75. A controller 77 controls the operation of the NSMF 12 in accordance with software stored in a memory 79. The software may be pre-installed in the memory 79 and/or may be downloaded via the telecommunication network 1 or from a removable data storage device (RMD), for example. The software includes, among other things, an operating system 81, a communications control module 83, and a slice management module 85.

The communications control module 83 is responsible for handling (generating/sending/receiving) signaling between the NSMF 12 and other nodes, such as the UE 3, the base station 5, and other core network nodes.

The slice management module 85 is responsible for handling slice requests (e.g. admission of new slices, modification of existing slices) and assisting slice scheduling (by the RRM 6). The slice management module 85 may also exchange (generate/send/receive), with other nodes, appropriately formatted requests and responses relating to network slice management and scheduling. The slice management module 85 may comprise a number of sub-modules, for example, a Translation module 90, a Slice Admission Control module 91, and a Self-Optimisation module 92, which will be described in detail in the next section.

DETAILED DESCRIPTION

A more detailed description of some exemplary embodiments is provided below with reference to FIGS. 5 to 14. Specifically, the following examples may be applicable to 5G RAN slicing in a scenario where multiple types of services (multiple tenants) are multiplexed into the same carrier bandwidth. Beneficially, the slice SLA model may be used regardless of the application category (eMBB, uRLLC, and mMTC).

Service instances of a slice are classified into two types: guaranteed services and non-guaranteed services. For guaranteed services, the most common requirements include reliability, guaranteed latency, guaranteed throughput or guaranteed fraction of resources; for non-guaranteed services, there is generally no rigid Quality of Service (QoS) requirement and they can be usually served on a first-come-first-served basis.

Guaranteed Services

For guaranteed services, it is assumed that network-level performance requirement $P_N$ of a slice can be translated into cell-level resource requirement $(R_{C_1}, R_{C_2}, \ldots R_{C_M})$ by the Network Slice Management Function (NSMF) 12 or Network Slice Subnet Management Function (NSSMF) [2], where $C_1, C_2 \ldots$ and $C_M$ are the determined relevant cells in the geographical area of interest. Resource requirement $R_{C_i}$ in cell i can be represented by the required number of resources N within a deadline interval D, whose values can be determined based on the performance requirement and average user behaviours of the considered slice. Resource requirement may be dynamically modified based on the changed performance requirements or user behaviours.

Whereas N to support guaranteed throughput can be relatively easily determined based on average radio channel conditions and average traffic demand, the real-time traffic pattern has to be considered when determining N to support guaranteed latency. For a slice with periodic traffic, the required number of resources per deadline interval can be determined straightforward. For a slice with sporadic traffic, the arrived traffic per deadline interval may be varying. To support hard latency requirement, N may need to be significantly over-provisioned to cover the worst traffic case.

Whereas hard latency requirement may be required for uRLLC traffic where every packet needs to be received before the deadline, it may be not necessary for eMBB or mMTC traffic where soft (statistical) latency guarantee is usually enough. Thus, N may be determined based on average traffic demand for eMBB or mMTC traffic. Reserved resources can be significantly reduced at the cost of occasional delay budget violations.

The deadline interval D is determined mainly based on the slice radio access delay budget (the allowed duration from the time a packet arrives at the RAN to the time the packet is successfully received by the UE) and Hybrid Automatic Repeat Request (HARQ) latency. For example, without considering processing delay, a simple method is to set D to be half of the radio access delay budget such that the new packets arriving at the end of a deadline interval can have opportunities for potential retransmissions within the following deadline interval.

In this document, a Physical Resource Block (PRB) is assumed as the minimum abstracted resource unit to be allocated to each slice. An example is given in Table I for translating network-level performance requirements of four slices to cell-level resource requirements for guaranteed services based on the estimated UE distribution and radio conditions. Depending on the reliability requirements of different slices, resources required by HARQ should be taken into account when deciding slice resource demands.

new/modified slice requests with network-level performance requirements are translated to cell-level resource requirements by a Translation module 90. They are then checked by a Slice Admission Control module 91. The admitted slice list together with per-cell resource demand of each slice shall be sent to the corresponding cells. A Self-Optimisation (SON) module 92 is configured to monitor (preferably continuously) Performance Management (PM) counters/alarms from each cell. If SLA violations happen (e.g. a delay budget violation ratio is above a threshold, throughput is below a threshold), the SON module 92 proceeds to reconfigure the parameters in the Translation module 90 and/or the Slice Admission Control module 91 such that more resources can be allocated in corresponding cells and/or less number of new/modified slice requests can be admitted. If no SLA violation happens for a continuous period (having a predetermined length), the SON module 92 may gradually lower the resource demands and/or increase the AC threshold.

In each Cell RRM 6, at time instance t, Earliest Deadline First (EDF) Slice Scheduler 93 collects the number of PRBs allocated to each slice in previous TTI from the MAC Scheduler 94. The Slice Scheduler 93 then calculates the quota of each slice (number of PRBs that a slice is entitled to use) in current TTI and sorts the slices. The sorted slice list together with quotas are input to MAC Scheduler. The MAC Scheduler 94 allocates the resources to the slices in the list in order up to the quota of each slice by employing either

TABLE 1

Table I: Example of Network-Level Performance Requirements to Cell-Level Resource Requirements Mapping for Guaranteed Services

| | | | Slice 1 (eMBB1) | Slice 2 (eMBB2) | Slice 3 (uRLLC) | Slice 4 (mMTC) |
|---|---|---|---|---|---|---|
| Performance Requirement | Geographical Area | | A | B | C | D |
| | Avg # of Users Per Cell | | 35 | 10 | 20 | 50 |
| | Packet Size (byte) | | 1500 | 1500 | 32 | 32 |
| | Performance Descriptor | UE Throughput (kbps) | 256 | 512 | 10 | 5 |
| | | Radio Access Delay Budget (ms)* | 300 | 50 | 5 | 500 |
| | | Packet Loss Rate | $10^{-4}$ | $10^{-3}$ | $10^{-5}$ | $10^{-2}$ |
| Resource Requirement | Deadline Interval (D) (ms) | | 150 | 25 | 2 | 250 |
| | #Guaranteed Resources (N) within Deadline Interval | Cell 1 | 6000 | 125 | — | — |
| | | Cell 2 | 5000 | 200 | — | 625 |
| | | Cell 3 | — | — | 4 | 750 |
| | | Cell 4 | 5500 | 200 | 10 | 550 |
| | | Cell 5 | — | 150 | 6 | — |

*Note that different numerologies and Transmission Time Intervals (TTIs) can be used for different slices in NR [5]. Shorter TTI in NR can significantly reduce the radio access delay which cannot be achieved in LTE.

With the performance-to-resource mapping, the network operator can implement efficient slice admission control to decide if a slice can be admitted or not to the network based on total network resource utilisation and slice priority. Each tenant (slice owner) can also implement its own user admission control to decide if a user can be admitted or not to the slice based on slice resource utilisation and user priority.

Non-Guaranteed Services

For non-guaranteed services, they should use any unused resources left by guaranteed services. They can be usually served on a first-come-first-served basis at packet level although more advanced methods are possible, e.g. based on relative priority.

Overall Functional Architecture and Procedure

Figure 5:
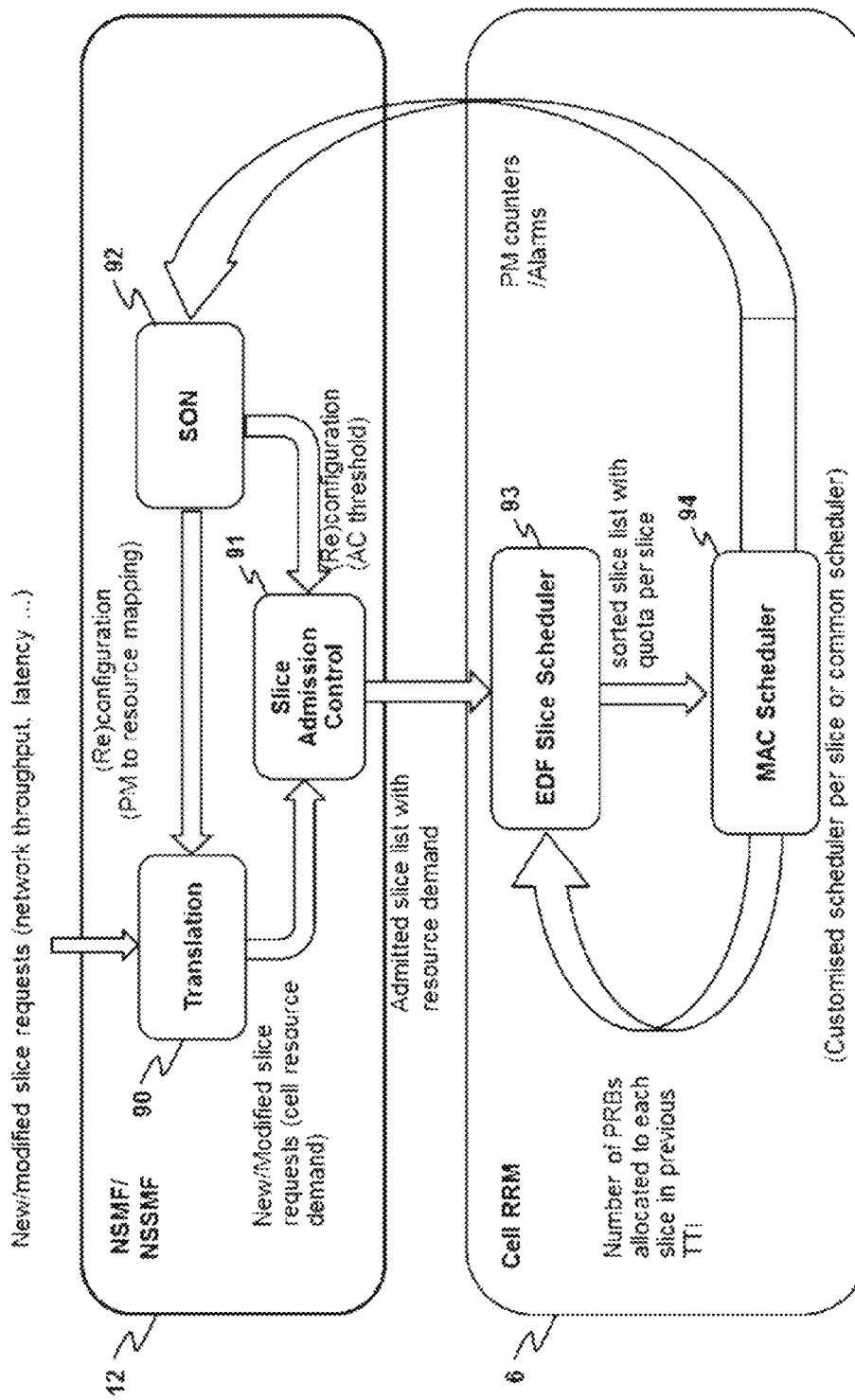
FIG. 5 illustrates schematically the overall functional architecture for network slicing supporting an exemplary slice SLA model in accordance with an example embodiment of the present invention.

The overall functional architecture of an exemplary embodiment is shown in FIG. 5. In the NSMF/NSSMF 12, slice-specific customised scheduler or common scheduler. Finally, the MAC Scheduler 94 or the RRM 6 may report any PM counters/alarms (such as delay budget violation ratio, throughput) to the SON module 92 periodically or when triggered by associated events.

The operations of each functional module will be further described in the following, focusing on the Cell RRM part.

Procedure of Functional Modules

EDF Slice Scheduler 93

Earliest Deadline First task scheduling is a scheduling method for operating systems and is integrated into Linux kernel [6]. In this system 1, the concept of EDF task scheduling is adapted to slice scheduling by modelling buffered traffic as task instance and mimicking CPU time with radio resources.

1) Basic Procedure

Figure 6:
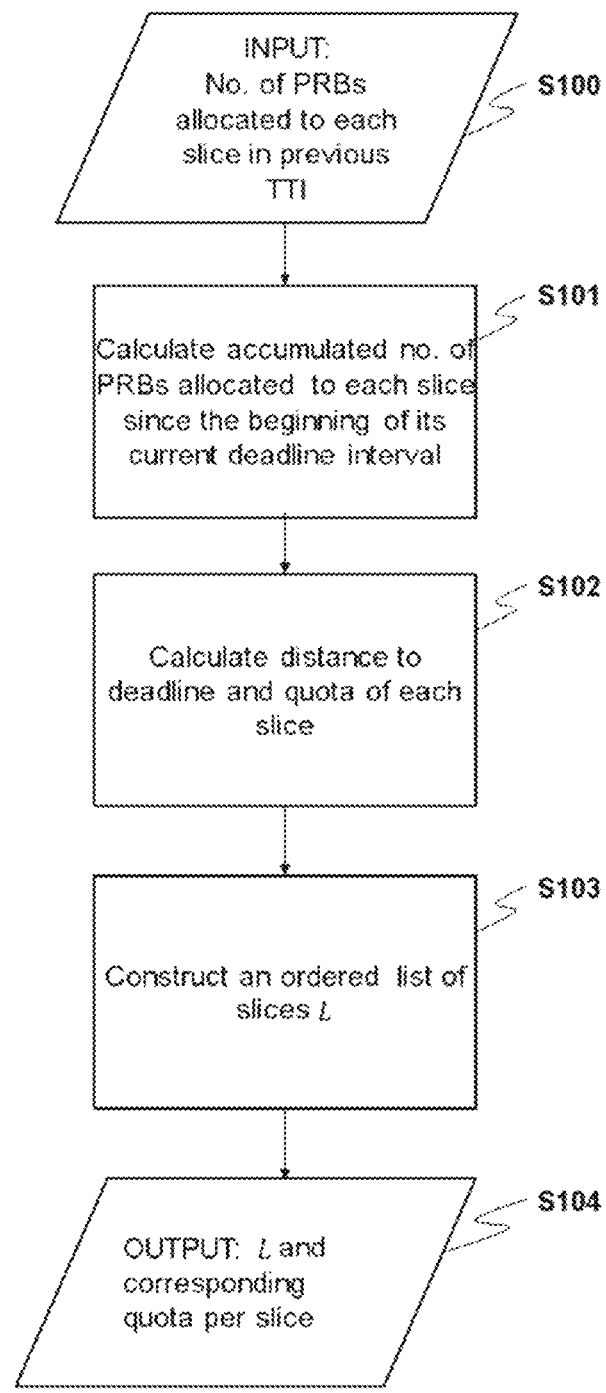
FIG. 6 is a schematic flowchart illustrating an exemplary way in which slice scheduling may be performed in accordance with an example embodiment of the present invention.

The basic procedure of an exemplary EDF Slice Scheduler 93 is shown in FIG. 6. At the beginning of current TTI, the Slice Scheduler 93 collects the number of PRBs allocated to each slice in previous TTI from MAC Scheduler (step S100). It then calculates the accumulated number of PRBs allocated to each slice i since the beginning of its current deadline interval (denoted as $n_i$) (step S101). Next, the Slice Scheduler 93 calculates the distance to the deadline of each slice i (denoted as $d_i$) and quota for each slice i (denoted as $q_i$) (step S102), as described in the following subsection. The EDF Slice scheduler 93 gives the highest priority to the slice with the lowest $d_i$. An ordered list of slice L is constructed by first adding all the slices in ascending order of $d_i$ and then adding a common slice at the end of the list (step S103). The common slice includes all the eligible slices (eligibility is based on SLA) and has unlimited quota, which is intended for overloaded traffic of the precedent slices in the list and non-guaranteed traffic (Note that slice priority can be also applied in common slice, e.g. earliest deadline first). Finally, the output of the Slice Scheduler 93: L and corresponding $q_i$ are input to the MAC Scheduler 94 (step S104).

Calculate $d_i$ and $q_i$ for Slice i:

Let $D_i$ denote the deadline interval and $N_i$ denote the required guaranteed number of PRBs per deadline interval for slice i. The procedure to calculate the distance to deadline $d_i$ and quota $q_i$ is shown in Algorithm 1.

In initialisation phase, set the distance to deadline $d_i=\infty$, the quota $q_i=0$, and a 'suspended' flag to false for each slice.

At TTI t, for each slice i, the following procedure is used to calculate new $d_i$ and $q_i$ based on the total quota in current deadline interval $Q_i$, the current PRB counter $n_i$, 'suspended' flag, and $d_i$:

[Math. 1]

if slice i has buffered data to transmit

If the distance to deadline $d_i=0$ (slice i reaches its current deadline) or $d_i=\infty$ (slice i was waiting for new traffic arrival), a new deadline interval $D_i$ shall be triggered together with the new quota $Q_i=N_i$. $n_i$ is reset to 0. 'suspended' flag is reset to false.

If the distance to deadline $0<d_i<\infty$ (the current deadline interval is on-going):

if 'suspended' flag is false (the slice always has buffered data to transmit since the current deadline is triggered), the quota $q_i$ is set to max(0, $Q_i-n_i$), If 'suspended' flag is true (the transmission queue was empty and new data just arrives at current TTI), a new deadline interval $D_i$ shall be triggered instead of using the current deadline interval. The reason is that if the current deadline is approached and $q_i$ is large, slice i may use a lot of resources before deadline to meet the deadline requirement which may block the traffic of other slices. By initiating a new deadline, the transmission of slice i may spread over the new period before the deadline while the radio access delay requirement of slice i can be still satisfied. The new quota is set to $$\min\left(N_i, Q_i - n_i + \left\lfloor N_i \frac{D_i - d_i}{D_i} \right\rfloor\right),$$

where $\lfloor x \rfloor$ is the floor of x. This is to ensure that the quota of each slice can be always satisfied before the respective deadline (proof is given later). Thus, the traffic condition in one slice does not affect the performance of other slices. Finally, $n_i$ is reset to 0. 'suspended' flag is reset to false.

If slice i has no data to transmit:

If the distance to deadline $d_i=0$ (slice i reaches its current deadline), set $d_i=\infty$.

If the distance to deadline $0<d_i<\infty$ (A deadline was triggered) and $Q_i-n_i>0$ (all the data have been transmitted but there is still some remaining quota to be used), set $q_i=Q_i-n_i$, 'suspended' flag to true.

Finally, for all the above cases with definite $d_i$, $d_i$ shall be reduced by one TTI duration as an input to next slice scheduling.

[Math. 2]

Figure 7:
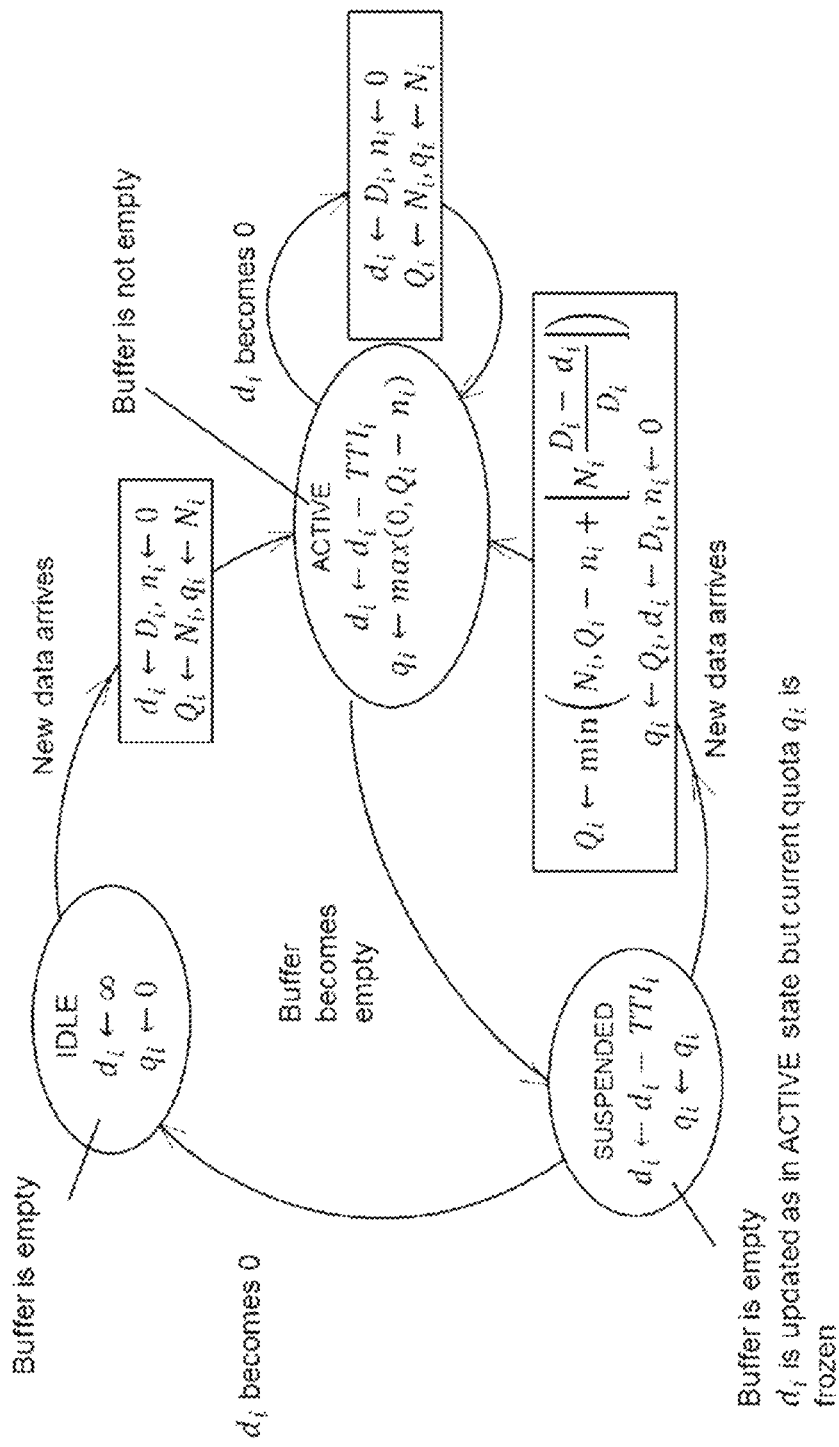
FIG. 7 is a schematic illustration of an exemplary state machine for slice scheduling in accordance with an example embodiment of the present invention.

Algorithm 1: Calculation of $d_i$ and $q_i$ for slice i in an exemplary basic procedure 1.   SLA model parameter: $D_i$, $N_i$
2.   Initialization: Set $d_i = \infty$, $q_i = 0$, 'suspended'=false, for each slice
3. 
4.   for each slice i:
5.     Input: $Q_i$, $n_i$, 'suspended', $d_i$
6. 
7.     if slice i has buffered data
8.       if $d_i = \infty$ or $d_i = 0$
9.         Set $d_i = D_i$, $n_i = 0$, 'suspended'=false
10.        Seq $Q_i = N_i$, $q_i = N_i$
11.       else
12.         if 'suspended'=false
13.           Set $q_i = \max(0, Q_i - n_i)$
14.         else
15.           Set $Qi = \min\left(N_i, Q_i - n_i + \left\lfloor N_i \frac{D_i - d_i}{D_i} \right\rfloor\right)$, $q_i = Q_i$
16.           Set $d_i = D_i$, $n_i = 0$, 'suspended'=false
17.         end if
18.       end if
19.     else
20.       if $d_i = 0$
21.         Set $d_i = \infty$
22.       else if $d_i < D_i$ and $Q_i - n_i > 0$
23.         Set $q_i = Q_i - n_i$, 'suspended'=true
24.       end if
25.     end if
26. 
27.     if $d_i < \infty$
28.       Set $d_i = d_i - TTI_i$
29.     end if
30. 
31.     Output to MAC: $d_i$, $q_i$
32.     Output to next slice scheduling: $Q_i$, $n_i$, 'suspended', $d_i$
33.   end for The basic behaviour of Algorithm 1 can also be understood as a state machine as shown in FIG. 7. (Note that unlike Algorithm 1, FIG. 7 does not describe how to handle cases where events happen simultaneously).

Feasibility Analysis

A feasibility analysis is given to establish whether and under which condition the configured quota of each slice can always be satisfied before its deadline.

[Math. 3]

Let $R_i^k$ denote the number of resources requested by slice i in deadline interval k. $R_i^k$ equals to the number of actually used resources by slice i in deadline interval k if slice i empties its transmission queue within deadline interval k while $R_i^k$ equals to the quota configured at the beginning of deadline interval k if slice i cannot empty its transmission queue within deadline interval k.

[Math. 4]

Definition 1; Given a set of slices and a time interval [$t_1$, $t_2$) ($t_1$ and $t_2$ are in unit of subframes), total resource demand of the slice set in [$t_1$, $t_2$) is defined as:

$$T_{(t_1,t_2)} = \sum_{i=1}^{m} \sum_{t_1 \leq b_i^k, b_i^k + D_i \leq t_2} R_i^k \tag{1}$$

where m is the number of slices in the slice set and $b_i^k$ is the beginning time of deadline interval k of slice i.

Namely, the resource demand in [$t_1$, $t_2$) is the sum of the resource amount requested by all the slices over all deadline intervals which begins at or after $t_1$ and expires before or at $t_2$. Note that any deadline interval of slice i that is not fully contained in [$t_1$, $t_2$) shall be excluded. We say that a deadline interval is in [$t_1$, $t_2$) only if its whole duration is included in [$t_1$, $t_2$).

[Math. 5]

Definition 2: Given a set of slices and interval [$t_1$, $t_2$), loading factor [$t_1$, $t_2$) is defined as:

$$u_{[t_1,t_2)} = \frac{r_{[t_1,t_2)}}{B(t_2 - t_1)} \tag{2}$$

where B is the number of PRBs in system bandwidth per subframe.

[Math. 6]

Definition 3: Maximum loading factor among all possible intervals is defined as:

$$u = \max_{[t_1,t_2)} (u_{[t_1,t_2)}) \tag{3}$$

Figure 8:
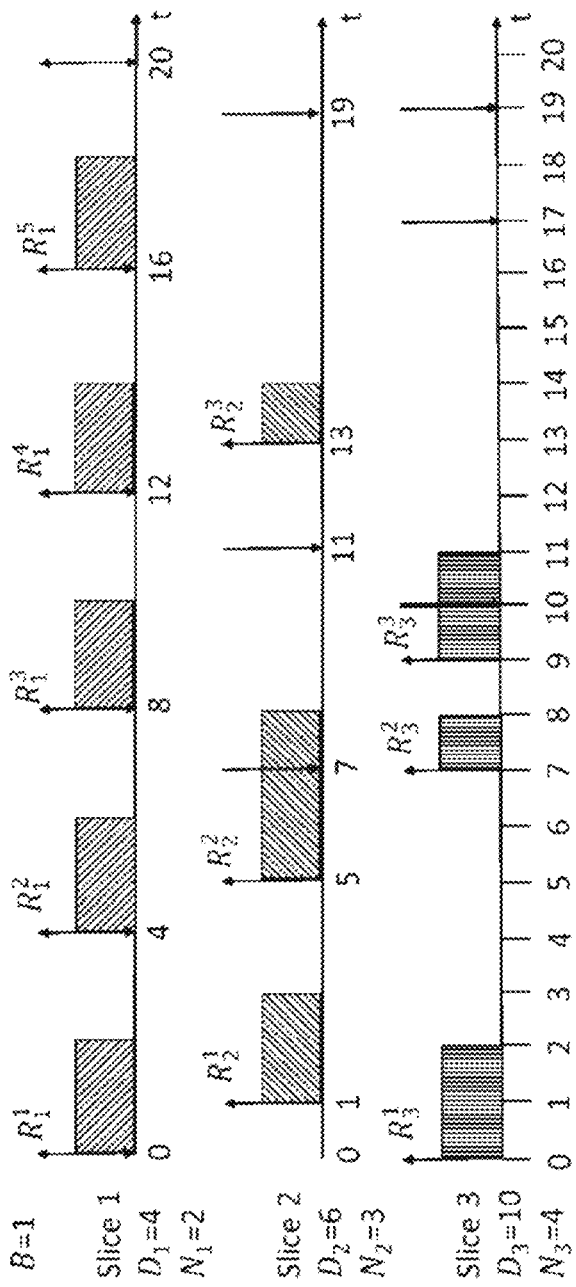
FIG. 8 illustrates an exemplary technique for calculating a load factor and a maximum loading factor.

An example is given in FIG. 8 to show how the load factor and maximum loading factor are calculated. For simplicity, it is assumed that B=1 in the example. Slice 1 has periodic traffic requesting 2 resources per 4 subframes which is also the quota per deadline interval. Slice 2 uses just 2 resources in the first deadline interval [1,7) to empty its transmission queue. New traffic arrives at time 5 and a new deadline interval [5,11) starts. Finally, new traffic arrives at time 13 after all the previous deadline intervals end. Slice 3 uses just 2 resources in the first deadline interval [0,10) to empty its transmission queue. Then, new traffic arrives at time 7 and uses just 1 resource. And then, new traffic arrives at time 9 and uses 2 resources. Note that only the load factors over the most congested intervals are shown. The maximum load factor is calculated as 13/12.

Figure 9:
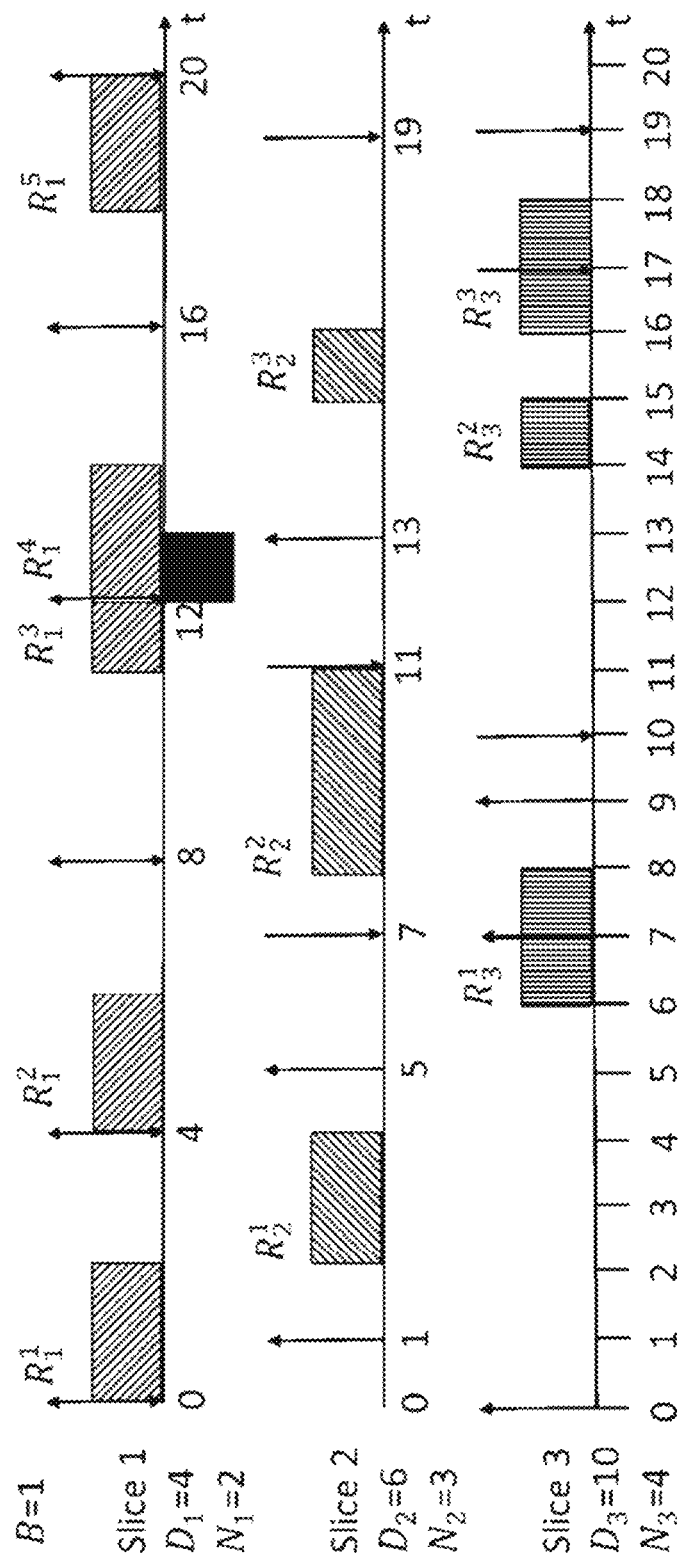
FIG. 9 illustrates the output of one of the scheduling methods proposed in the present invention.

FIG. 8 illustrates an exemplary technique for calculating a load factor and a maximum loading factor. The output of EDF scheduling for the example in FIG. 8 is shown in FIG. 9. A deadline miss happens for Slice 1 in deadline interval [8,12).

[Math. 7]

Theorem 1: A slice set can be feasibly scheduled by EDF if and only if:

$$u \leq 1 \tag{4}$$

Proof: The theorem can be proved similarly as Spuri's theorem [7].

[Math. 8]

"If": We prove it using contradiction. Assume there is a deadline miss at time $t_2$, $t_2$ must be the end of at feast one deadline interval k. Let $t_1$ denote the starting time of deadline interval k. Since there is a deadline miss at $t_2$, the requested resource amount in [$t_1$, $t_2$) must be greater than the total number of resources in this interval, i.e. $R_{[t_1,t_2)}$>B($t_2$−$t_1$). Thus, we have $u_{[t_1,t_2)}$>1 and hence u>1, which is contradicted to the condition u≥1.

"Only if": Since the scheduling is feasible, the total resource demand of the slice set in any time interval must be fess than or equal to the total number of resources in this interval, i.e. $r_{[t_1,t_2)}$≤B($t_2$−$t_1$). Thus, we have $u_{[t_1,t_2)}$≤1 for any [$t_1$, $t_2$) and hence u≤1.

[Math. 9]

Theorem 2: A slice set can be feasibly scheduled using Algorithm 1 if and only if:

$$U = \Sigma_{i=1}^{m} \frac{N_i}{B \cdot D_i} \leq 1 \tag{5}$$

Proof: From Theorem 1, it is sufficient to show that U=u to prove this theorem.

"$u_{[t_1,t_2)}$≤U": We first prove $u_{[t_1,t_2)}$≤U for any interval [$t_1$, $t_2$).

For any slice i, a deadline interval belongs to one of the following three types:

Type (1): The quota in deadline interval k is used up.

Type(2): The transmission queue becomes empty before the quota is used up and no new traffic arrives before the end of this deadline interval.

Type(3): The transmission queue becomes empty before the quota is used up and new traffic arrives before the end of this deadline interval.

[Math. 10]

For slice i in any interval [$t_1$, $t_2$), there are $L_i^1$ deadline intervals (can be any type) which are not overlapped with any other deadline interval in [$t_1$, $t_2$), and $L_i^2$ overlapping subintervals in which a deadline interval is overlapped with at least one deadline interval in [$t_1$, $t_2$). In an overlapping subinterval l spanning [$t_i^{l,1}$, $t_i^{l,2}$), the first deadline interval starts at $t_i^{l,1}$ (must be Type(3)) and the last deadline interval ends at $t_i^{l,2}$ (can be any type). Let $K_i^l$ (≥2) denote the number of deadline intervals in overlapping subinterval l for slice i. Let $R_i^{l,k}$, $Q_i^{l,k}$, and $d_i^{l,k}$ denote the requested number of resources, the quota, and the distance io deadline when next deadline interval starts in the kth deadline interval of overlapping subinterval l, respectively. We have the total resource demand of slice i in overlapping subinterval l;

[Math. 11]

$$r_i^l = \sum_{k=1}^{K_i^l} R_i^{l,k} \leq \sum_{k=1}^{K_i^l - 1} R_i^{l,k} + Q_i^{l,K_i^l} = \tag{6}$$

$$\sum_{k=1}^{K_i^l - 1} R_i^{l,k} + \min\left(N_i, Q_i^{l,K_i^l - 1} - R_i^{l,K_i^l - 1} + \left\lfloor N_i \frac{D_i - d^{l,K_i^l - 1}}{D_i} \right\rfloor\right) \leq$$

$$\sum_{k=1}^{K_i^l - 1} R_i^{l,k} + Q_i^{l,K_i^l - 1} - R_i^{l,K_i^l - 1} + N_i \frac{D_i - d_i^{l,K_i^l - 1}}{D_i} =$$

$$\sum_{k=1}^{K_i^l - 2} R_i^{l,k} + Q_i^{l,K_i^l - 1} + N_i \frac{D_i - d_i^{l,K_i^l - 1}}{D_i} \ldots \leq$$

-continued $$Q_i^{t,1} + \sum_{k=1}^{K_i^l-1} N_i \frac{D_i - d_i^{l,k}}{D_i} \le$$

$$\frac{N_i}{D_i}\left(D_i + \sum_{k=1}^{K_i^l-1}(D_i - d_i^{l,k})\right) = \frac{N_i}{D_i}(t_i^{l,2} - t_i^{l,1})$$

[Math. 12]

Thus, we have the total resource demand of slice i in any interval $[t_1, t_2]$:

$$r_i^{(t_1, t_2)} = \sum_{k=1}^{L_i^1} R_i^k + \sum_{i=1}^{L_i^2} r_i^l \le L_i^1 N_i + \sum_{l=1}^{L_i^2} \frac{N_i}{D_i}(t_i^{l,2} - t_i^{l,1}) \quad (7)$$

Note that when $L_i^1$ or $L_i^2 = 0$, the corresponding term equals to 0. And since $D_i L_i^1 +$ $$\Sigma_{i=1}^{L_i^2}(t_i^{l,2} - t_i^{l,1})) \le t_2 - t_1,$$

we have the load factor:

$$u_{[t_1,t_2)} = \sum_{i=1}^{m} \frac{r_i^{[t_1,t_2)}}{B(t_2 - t_1)} \le \quad (8)$$

$$\sum_{i=1}^{m} \frac{N_i}{B \cdot D_i} \frac{D_i L_i^1 + \Sigma_{i=1}^{L_i^2}(t_i^{l,2} - t_i^{l,1})}{t_2 - t_1} \le \sum_{i=1}^{m} \frac{N_i}{B \cdot D_i} = U$$

"$u_{[t_1,t_2)} = U$": We then find a special case to show $u_{[t_1,t_2)} = U$ for specified interval $[t_1, t_2]$.

[Math. 13]

In the case that all the slices have full buffered traffic and all the slices start their first deadline intervals at $t_1=0$, let $t_2=\text{lcm}(D_1, D_2, \ldots D_m)$ where lcm denotes least common multiple, we have:

$$u_{[t_1,t_2)} = \sum_{i=1}^{m} \frac{r_i^{[t_1,t_2)}}{B(t_2 - t_1)} = \sum_{i=1}^{m} \frac{\frac{t_2}{D_i}N_i}{B \cdot t_2} = \sum_{i=1}^{m} \frac{N_i}{B \cdot D_i} = U \quad (9)$$

Thus, we have $$u = \max_{[t_1,t_2)}(u_{[t_1,t_2)}) = U.$$

The above theorem provides nice features for slice scheduling and admission control. As long as $U \le 1$, the quota configured for each slice in each deadline interval can be always satisfied regardless of the traffic dynamics of other slices. However, if the quota is not enough to empty the transmission queue before reaching the deadline, deadline miss (and thus delay budget violation) may happen. One solution is to configure the quota to a very large value to accommodate the worst case traffic scenario. However, this is very resource and cost inefficient since most time the traffic demand is much less than the quota. And thus, this solution may be only used for small-volume uRLLC traffic requiring strict latency guarantee. More realistically, the quota is configured based on the average traffic condition and methods like the following one are used to mitigate the delay budget violation ratio but may not completely eliminate it.

2) Replenishing Procedure

Due to the dynamic traffic and varying radio channels, the number of PRBs required at the MAC Scheduler 94 for transmitting all the traffic of slice i may be larger than the quota at current III. At subframe t, if the quota of slice i for current deadline interval is used up but the deadline is still not approached, the Slice Scheduler 93 may immediately replenish the quota of slice i by setting $q_i=N_i$ and postpone its deadline by setting $d_i=d_i+D_i$. The other operations are the same as in basic procedure.

The rationale behind the above operation is based on the "Constant Bandwidth Server" idea in [8]. A slice can borrow the quota in its next deadline interval in the hope that the borrowed resources are not required in the next deadline interval. If more resources are required in the next deadline interval, it may itself borrow the quota in the subsequent deadline interval after it. In this way, a slice with the quota configured based on average resource demand per deadline interval can meet far more deadlines although there is no guarantee that the deadline can be always respected. An example is given in FIG. 10 to show the benefit of quota replenishing. For simplicity, it is assumed that the system bandwidth B=1. Slice 1 requires 3 PRBs before deadline ending time 4 however its quota is only 2 PRBs. Without replenishing, after the quota of Slice 1 is used up, the next slice in the slice list shall be scheduled and deadline miss happens for Slice 1. With replenishing, Slice 1 borrows the quota from the next deadline interval and no deadline miss happens. Note that since the deadline is also extended to be the end of the next deadline interval this procedure does not affect the EDF feasibility.

Figure 10:
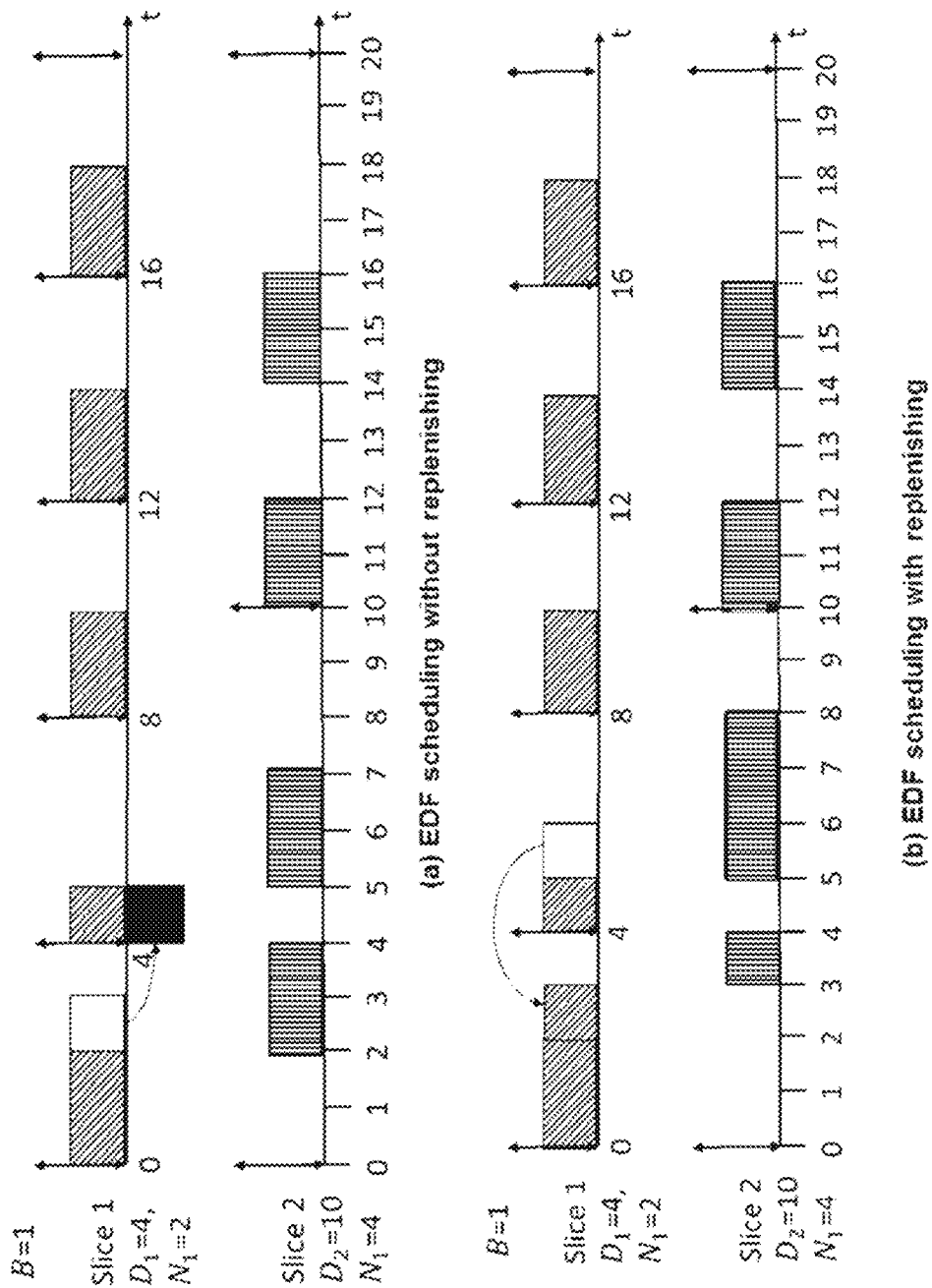
FIGS. 10 (a) and (b) are comparison of two exemplary scheduling methods in accordance with the present invention.

FIG. 10 illustrates a benefit associated with replenishing. Specifically, FIG. 10 (a) illustrates an exemplary EDF scheduling approach without replenishing, and FIG. 10 (b) illustrates an exemplary EDF scheduling approach with replenishing.

The replenishing procedure intends to mitigate the impact of the short-term traffic boost only. Unlimited number of replenishing may adversely affect the latency of the following packets. In addition, each slice may have different traffic patterns, e.g. peak-to-average traffic ratio. Thus, a replenishing limit is applied on a per-slice basis such that the number of continuous extended deadlines is bounded by this limit.

3) Overriding Procedure

While replenishing procedure may mitigate the impact of the traffic dynamics to some extent, it cannot cope with the increased average traffic load and/or the increased traffic variance. Due to the criticality of uRLLC slice, the traffic of uRLLC slice may override the ones of other slices with lower priorities. In principle, this idea is similar to 3GPP NR puncturing procedure [5], where uRLLC scheduled traffic may preempt the ongoing eMBB scheduled traffic in certain resources.

In particular, each slice in the output list of the Slice Scheduler 93 will now become a virtual slice, to which one or multiple actual slices can be mapped. The following look-up table shall be pre-configured at MAC Scheduler:

TABLE 2

Table II: Example of look-up able for slice mapping

| Slice 1 | Slice 2 | Slice 3 | Slice 4 |
|---|---|---|---|
| uRLLC > eMBB2 > eMBB1 | uRLLC > eMBB2 | uRLLC | mMTC | where ">" indicates the priorities within the slice. In Table II, uRLLC, eMBB2 and eMBB1 slice are mapped to Slice 1. uRLLC slice has absolute priority over eMBB2 and eMBB1 slice and eMBB2 slice has absolute priority over eMBB1 slice. When the ordered slice list is received by MAC Scheduler, MAC Scheduler can schedule the UEs based on the loop-up table. Each actual slice can still use its own MAC scheduler in the overridden resources. To facilitate SON function, PM counters shall report the performance of each actual slice rather than each virtual slice to identify the origin of excess traffic.

Note that it may be expected to configure the number of slices, slice deadline, quota and etc. considering the mixed traffic situation since the slices now represent virtual slices. Note also that only the original slices to be overridden are affected while the quotas of the other slices can still be guaranteed before each deadline under EDF.

MAC Scheduler

The procedure of MAC Scheduler is shown in FIG. 11. After checking whether there are any (remaining) slices to process (step S201), the first slice in the list is selected (step S202). Either slice-specific customised (step S205) or common MAC Scheduler (step S206) can be called to make resource allocation up to the quota $q_i$ (step S207) except for common slice where common MAC Scheduler is used (step S203: 'YES'). If there are remaining resources (step S208: 'YES'), the procedure returns to step S201, in which the next slice in the list is selected. The method repeats until no resource is left (step S208: 'NO') or no slice is left in the list (step S201: 'YES').

In principle, any kind of customised scheduler and common scheduler can be employed. A general rule is that, preferably, any retransmission should be prioritised over the new transmissions whenever a slice gains the access.

MAC Scheduler will also report the number of PRBs allocated to each slice per TTI to the Slice Scheduler 93 and report the PM counters/alarms (such as delay budget violation ratio, throughput) to the SON module 92, which are not shown in FIG. 11.

Translation

The Translation module 90 is responsible for translating network-level performance requirement of a slice to cell-level resource requirements. An example has been shown in Table I. The mapping may be determined by operator policies, SLAs, traffic distribution, radio conditions and etc. It may be self-configured and self-optimised by SON module based on the collected statistics and feedback. For example, some UEs from an eMBB slice with video streaming service may move from one cell to another. Corresponding resource demands shall be transferred between the two cells.

Slice Admission Control

For new/modified slice requests in terms of cell-level resource demands, the Slice Admission Control (AC) module 91 determines if they can be admitted based on the current system resource utilisation and operators' policies (For example, certain type of slices may be given higher priority). Slice AC may reject certain new/modified slice requests such that the guaranteed number of resources can be provided to each admitted slice before its predefined deadline.

[Math. 14]

Based on Theorem 2, a simple threshold-based method can be used in Slice AC. A slice request can be admitted as long as all the m existing slices and the new slice satisfy:

$$\Sigma_{i=1}^{m} \frac{N_i}{B \cdot D_i} + \frac{N_{new}}{B \cdot D_{new}} \le \sigma \quad (10)$$

Where $\sigma$ is the AC threshold. Although $\sigma$ can be set to 1 for maximising the guaranteed resource utilisation, a more realistic configuration is to set $\sigma<1$, which can tolerate the traffic dynamics of the admitted guaranteed services to certain extent and also avoid starvation for non-guaranteed services.

SON

The Self-Organising module 92 may have the following functions:

It adjusts AC threshold based on traffic ratio of guaranteed and non-guaranteed services and operators' policies.

It collects performance indicators from MAC Scheduler to adjust the parameters in Translation module such that the determined cell-level resources can reflect the required performance (such as throughput, latency, delay budget violation ratio) and adapt to network dynamics (such as changed traffic distribution or radio environment).

It may be used for both initial parameter self-configuration and subsequent self-optimisation.

Performance Evaluation

Figure 12:
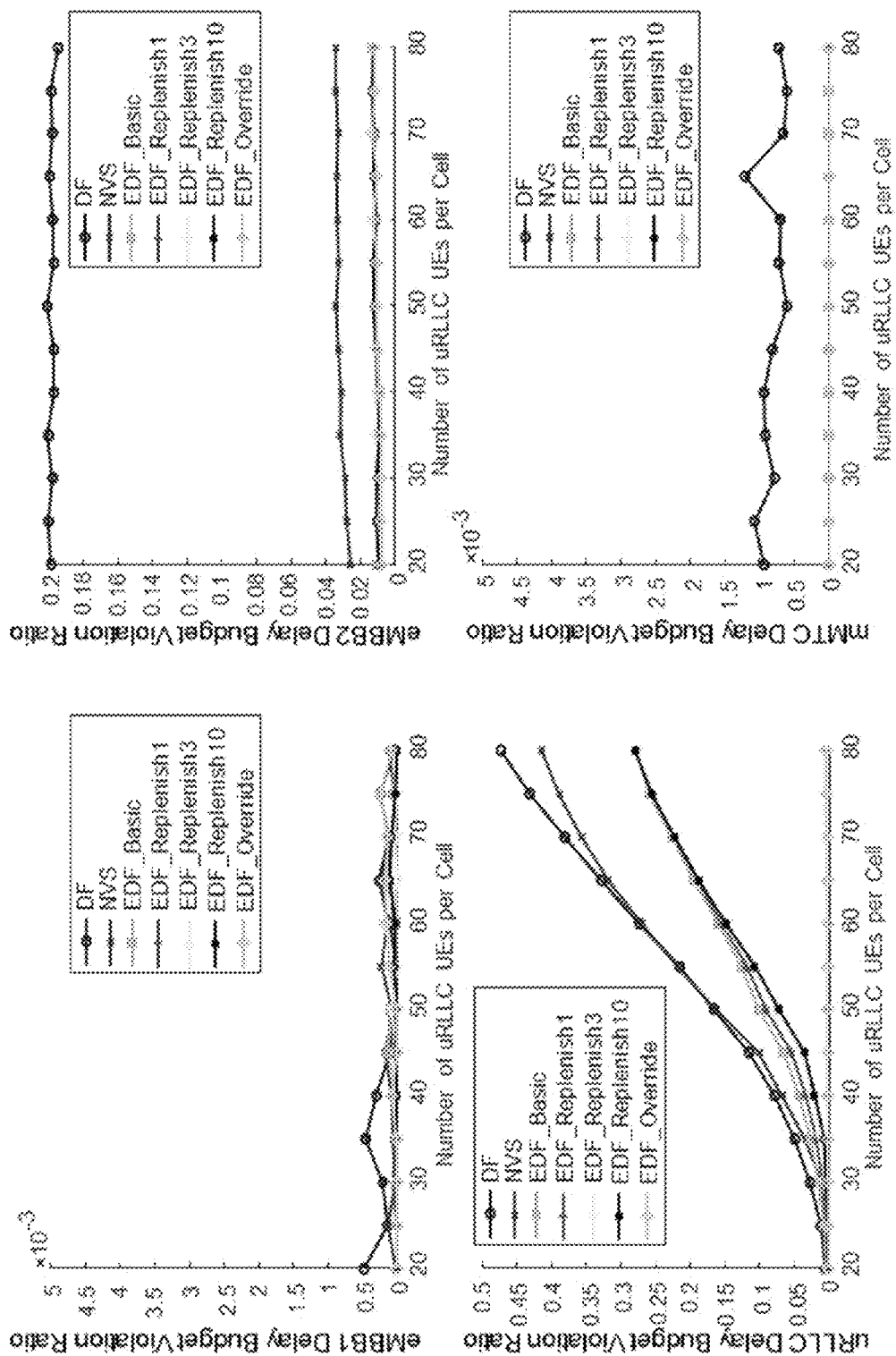
FIG. 12 shows simulation results for an exemplary slice scheduler in accordance with an example embodiment of the present invention.
Figure 13:
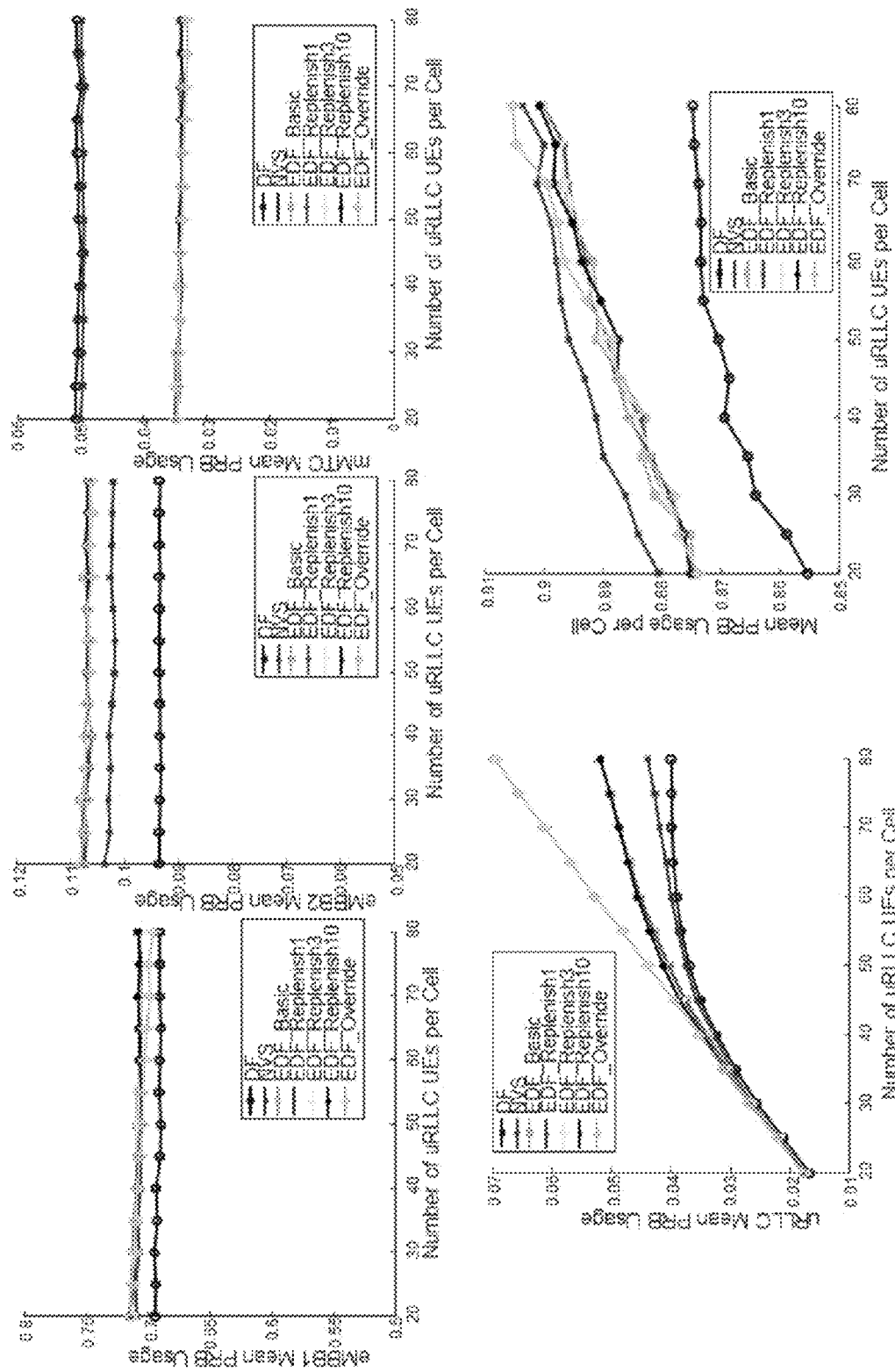
FIG. 13 shows simulation results for an exemplary slice scheduler in accordance with an example embodiment of the present invention.
Figure 14:
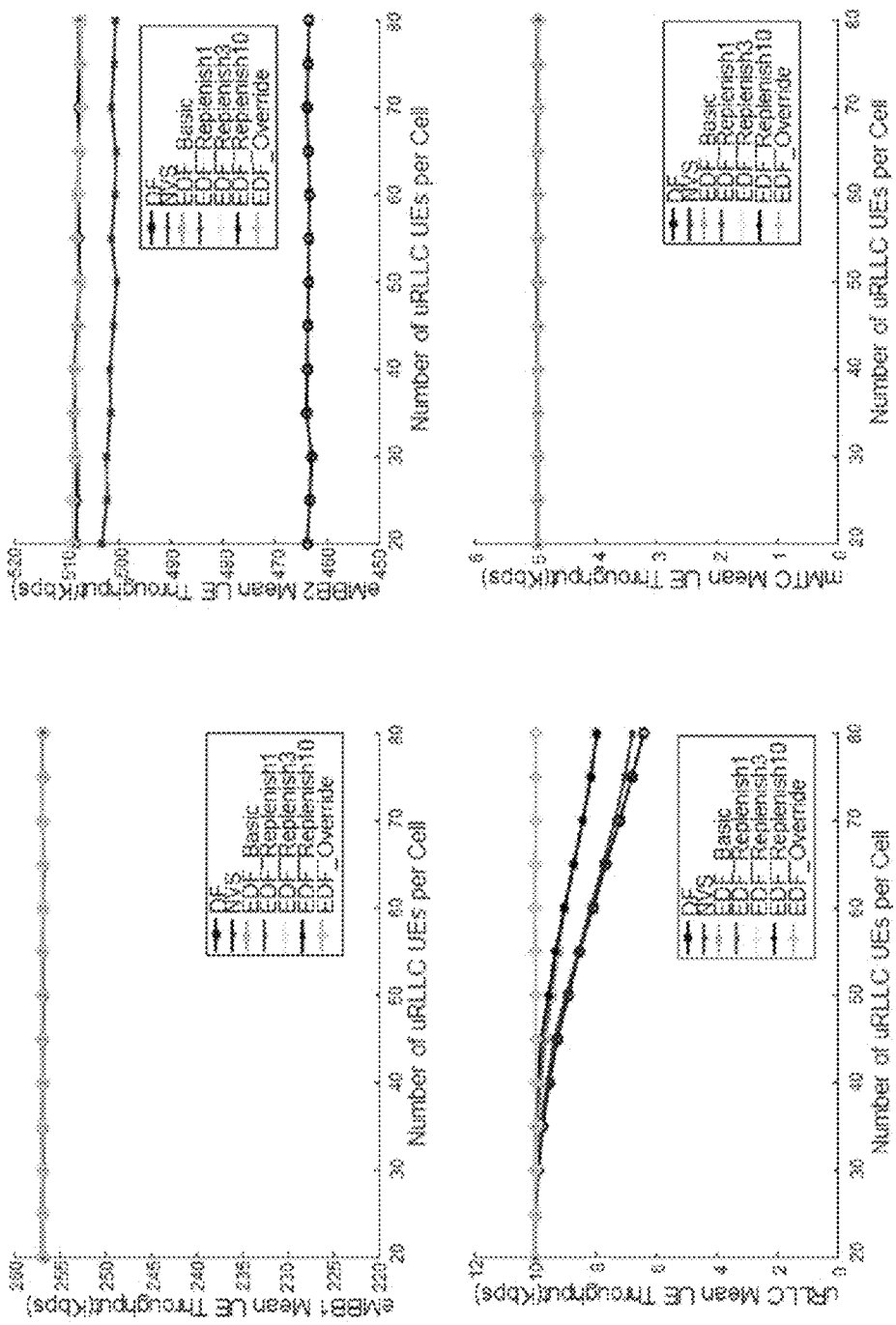
FIG. 14 shows simulation results for an exemplary slice scheduler in accordance with an example embodiment of the present invention.

Simulation results are presented in this section to evaluate the performance of the above described EDF Slice Scheduler 93. The simulation results are illustrated in FIGS. 12 to 14. Specifically, FIG. 12 shows the delay budget violation ratio with increased number of uRLLC UEs, FIG. 13 shows the mean PRB usage with increased number of uRLLC UEs, and FIG. 14 shows the mean UE throughput with increased number of uRLLC UEs.

Simulation Configurations

An in-house LTE system simulator is used which models the detailed LTE protocol stack and 3GPP-compliant radio environment. The main parameters used in simulations are given in Table III. Without loss of generality, the example in Table I is reused here to represent slice requirements. The UEs of eMBB1 slice and mMTC slice are randomly distributed over the entire macrocell coverage. The UEs of eMBB2 and uRLLC slices are randomly distributed within 75 m of each macro site such that the impact of inter-cell interference can be mitigated. The packet inter-arrival times are modelled as a Poisson process unless explicitly stated otherwise.

To achieve the corresponding radio access latency in Table I, the deadline interval of each slice is set to be (around) half of its radio access delay budget. Thus, new packets arriving at the end of a deadline interval can have their transmissions including retransmissions completed before the end of the next deadline interval without exceeding its radio access delay budget. A different maximum number of HARQ retransmissions are configured for each slice according to the latency/reliability requirements and physical layer limitation. Since ACK/NACK feedback delay is assumed to be 2 ms, if a transmission fails at subframe 1, the earliest possible retransmission can be received at subframe 4 (assume no processing delay at scheduler). Thus, only one retransmission is allowed for uRLLC slice. To focus on the impact of slice scheduling, it is assumed that a packet can be always successfully received after the maximum number of retransmissions has been reached. In addition, an RLC SDU discard timer is configured on a per-slice basis according to the specific radio access delay budget. The SDUs whose sojourn time have already exceeded the delay budget will be discarded without further processing.

Several schemes are compared in simulations: DF (Dedicated Frequency in which the bandwidth is hard partitioned into subbands and each slice can only use the resources within its allocated subband), NVS [3], EDF_Basic, EDF_ReplenishX (X is the replenishing limit of the uRLLC slice. For other slices, the replenishing limits are set to 0), and EDF_Override (uRLLC slice overrides eMBB1 slice). For comparison purpose, the same resource shares are used for all the schemes. For simplicity, the same PF MAC Scheduler 94 is used in all the slices although the handling of retransmissions is different between NVS and EDF schemes. With the EDF Slice Scheduler 93, whenever a slice gains the access to the resources, it will always schedule its retransmissions first if any and then its new transmissions. The retransmissions of the second slice will only happen after the resource allocation for the first slice has been finished. With NVS Slice Scheduler, at each TTI, the retransmissions from all the slices are first scheduled regardless of the slice priority.

The delay budget violation ratio is calculated as the sum of the number of discarded packets and the number of received packets exceeding the delay budget divided by the total number of packets sent. It can be seen that the delay budget violation ratio ratios of mMTC and eMBB1 slice are zero or close to zero since they have large delay budgets and their reserved resources are adequate to support current traffic loads. For eMBB2 and uRLLC slice, delay budget violations happen due to overloaded traffic. For eMBB2 slice, both NVS and EDF schemes have significantly low delay budget violation ratios than DF since they allow the dynamic sharing of resources between different slices, i.e. the unused quotas of other slices can be borrowed by eMBB2 slice. Furthermore, EDF outperforms NVS due to the resource reservation per deadline. However, for uRLLC slice, the borrowed resources are not very useful due to the very small delay budget. Compared to EDF schemes, the delay budget violation ratio of uRLLC slice with NVS is quickly increased as its traffic load increases because the slice priority in NVS depends on the relative ratio of resource usage and reservation of each slice. EDF schemes with replenishing can mitigate the impact of short-term traffic boost and have lower delay budget violation ratio than EDF_Basic when the average traffic load is low. However, as the traffic load increases, extended deadline may adversatively affect the latency performance. In particular, EDF with larger replenishing limit can tolerate more traffic dynamics but also have more packet queueing/dropping

TABLE 3

| Table III: Simulation configurations | | | |
|---|---|---|---|
| System bandwidth | 10 MHz (50 PRBs) | | |
| Simulation duration | 10.5 seconds (including 0.5 seconds warm-up time) | | |
| Cell layout | 7 macrocells with wrap around, ISD 500 m, | | |
| Carrier frequency | 2 GHz | | |
| Tx power | 40 W | | |
| Path loss | Urban Macro in TR 36.814 [9] | | |
| Shadowing | Correlation distance | 50 m | |
| | Standard deviation | 8 dB | |
| Fading Doppler Frequency | 5 Hz | | |
| MAC Scheduler | Type | Proportional fair | |
| | MIMO | 2 × 2, TM4 | |
| | RBG size | 1 | |
| | OLLA | Enabled | |
| | ACK/NACK delay | 2 ms | |

| Slice-Specific Parameters | | | | |
|---|---|---|---|---|
| | eMBB1 | eMBB2 | uRLLC | mMTC |
| Geographical area | Macrocell coverage | 75 m within a macro site | 75 m within a macro site | Macrocell coverage |
| Average no. of UEs per cell | 35 | 10 | 20 | 50 |
| Deadline interval (subframes) $D_i$ | 150 | 25 | 2 | 250 |
| No. of PRBs per deadline interval $N_i$ | 6000 | 125 | 4 | 750 |
| Resource share | 0.8 | 0.1 | 0.04 | 0.06 |
| Max no. of HARQ Retx | 5 | 3 | 1 | 9 |
| RLC SDU discard timer (ms) | 300 | 50 | 5 | 500 |

Simulation Results

In the first set of simulations, the traffic load of uRLLC slice is increased from 20 UEs per cell to 80 UEs per cell. The delay budget violation ratio, mean PRB usage, and mean UE throughput of each slice are shown in FIG. 12, FIG. 13, and FIG. 14 respectively.

under heavy load than EDF with smaller replenishing limit. Impressively, EDF_Override achieves zero delay budget violation ratio for uRLLC slice at the cost of slightly increased violation ratio of eMBB1 slice.

EDF schemes have the lowest PRB usage for mMTC slice among all the schemes. This is because that with the flexibility of large delay budget EDF schemes can better exploit multi-user diversity such that the same traffic can be transmitted with less number of PRBs. For eMBB2 and uRLLC slice, EDF schemes have the highest PRB usage among all the schemes due to the guaranteed resources per deadline and resource borrowing from other slices.

Both eMBB1 and mMTC slice support guaranteed UE throughput. The UE throughput of eMBB2 slice is lower than the requested rate due to its overloaded traffic. The requested rate of uRLLC slice can be supported when there is no delay budget violation. As the traffic load increases, delayed packets in transmission queue will be discarded and thus the UE throughput will decrease in all the schemes except EDF_Override.

In the second set of simulations, the requested rate of each UE in each slice is increased by 10 times and the discarding timer is disabled such that the transmission queue of each slice is always non-empty except the uRLLC slice when EDF_Override is used. Table IV shows the mean PRB usage of each slice with different schemes.

TABLE 4

Table IV: Mean PRB usage of each slice under full queue traffic

|  | eMBB1 | eMBB2 | uRLLC | mMTC |
| --- | --- | --- | --- | --- |
| DF | 0.8000 | 0.1000 | 0.0400 | 0.0600 |
| NVS | 0.7900 | 0.1025 | 0.0437 | 0.0638 |
| EDF_Basic | 0.8003 | 0.0998 | 0.0400 | 0.0600 |
| EDF_Replenish3 | 0.8003 | 0.0998 | 0.0400 | 0.0600 |
| EDF_Override | 0.6980 | 0.0998 | 0.1423 | 0.0600 |

It can be seen that DF and EDF schemes can achieve the resource ratio exactly as requested (the small deviation in EDF is due to the unaligned measurement and deadline intervals) while the requested resource ratio cannot be precisely provided in NVS. In particular, in EDF_Override, uRLLC traffic takes the place of eMBB1 traffic without affecting other slices.

SUMMARY

In this document, a framework to enable 5G RAN slicing to satisfy diverse slice requirements is described. A new slice SLA model is used to convert the slice requirements in terms of throughput, latency, resource usage, etc. into the required number of resources per deadline. The idea of Earliest Deadline First scheduling is exploited for resource allocation in network slicing. Simulation results show that the schemes based on EDF can fulfil all the basic requirements of network slicing: diverse performance, customisation, isolation, and efficient resource utilisation. Depending on the operators' requirements, different variations can be adopted and further tuned.

The above described slice SLA model beneficially provides at least one of the following benefits, amongst others:
  A slice may be dynamically created, removed, or modified.
  The coverage of a slice may be very different.
  A slice may have multiple service instances requesting guaranteed and/or non-guaranteed performances.
  The performance requirements in terms of throughput, latency, reliability, accessibility and etc. may be very different. Customisation for these parameters is supported.
  The guaranteed performance of a slice is not affected by the conditions of other slices with the same or lower priorities.
  It is possible for a tenant (slice owner) to apply customised admission and scheduling policies for guaranteed resources.
  The overall (weighted) resource utilisation or revenue is maximised from a network operator's perspective.

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

It will be appreciated that the above example embodiments may be applied to both 5G New Radio and LTE systems (E-UTRAN).

It will be appreciated that the above described system may be shared between a plurality of network operators (each network operator serving one or more tenants). In this case, the network may comprise one or both of: (i) a so-called Multi-Operator Core Network (MOCN), in which each operator has its own core network, but the operators share the RAN; and (ii) a so-called Gateway Core Network (GWCN), in which the operators share the RAN and at least a part of the core network, e.g. at least a Mobility Management Entity (in LTE) or an AMF (in 5G).

In the above description, the UE, the base station, and the NSMF (NSSMF) are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above example embodiments, a number of software modules were described. As those skilled in the art will appreciate, the software modules may be provided in compiled or un-compiled form and may be supplied to the UE, the base station, and the NSMF as a signal over a computer network, or on a recording medium. Further, the functionality performed by part or all of this software may be performed using one or more dedicated hardware circuits. However, the use of software modules is preferred as it facilitates the updating of the UE, the base station, and the NSMF in order to update their functionalities.

The above example embodiments are also applicable to 'non-mobile' or generally stationary user equipment.

The above described first method may further comprise obtaining information identifying whether the at least one cell-level resource requirement (e.g. a delay budget violation ratio requirement and/or a throughput requirement) associated with the admitted slice instance is met in a given interval and (re)configuring at least one of said translating and said determining for a subsequent interval. In this case, the (re)configuring may comprise at least one of: increasing an amount of resources allocated to the slice instance in a cell serving the slice instance; and reducing a number of slice instances that can be admitted concurrently.

The above described first method may further comprise: obtaining information identifying an average and/or a historical usage behaviour (e.g. a data traffic pattern) associated with the slice instance to which the request relates: and translating, from the at least one network-level performance requirement for the slice instance, to at least one associated cell-level resource requirement based on the obtained information identifying an average and/or historical usage.

The at least one cell-level resource requirement may comprise a number of communication resources required in a given interval (e.g. in a deadline interval).

In the above described first and second methods, a particular network-level performance requirement associated with a particular slice instance may be based on a Service Level Agreement (SLA) associated with that slice instance.

The at least one network-level performance requirement may be associated with at least one of the following service categories: guaranteed services, non-guaranteed services; voice calls; video calls; text/multimedia messaging; social networking; cloud services; mobile broadband; Enhanced Mobile Broadband (eMBB); Ultra-Reliable and Low-Latency Communications (uRLLC); and Massive Machine Type Communications (mMTC). The slice request in the first method may comprise information identifying at least one service category for the slice instance to which the request relates.

The at least one network-level performance requirement may comprise at least one of the following: a reliability requirement, a guaranteed latency requirement, a guaranteed throughput requirement, and a guaranteed fraction of resources requirement.

The above described first method may further comprise determining, for a plurality of slice instances, a respective deadline for delivery of a data packet, based on the at least one cell-level resource requirement associated with that slice instance; and allocating communication resources to each slice instance in order of their respective deadlines, starting from the slice instance having the earliest deadline.

The above described first method may further comprise determining a deadline interval for a particular slice instance based on at least on of: a slice radio access delay budget representing an allowed duration from the time a packet arrives at a Radio Access Network (RAN) portion of the communication network to the time the packet is successfully received by an item of User Equipment (UE) associated with that slice instance; a Hybrid Automatic Repeat Request (HARQ) latency; and a processing delay. In this case, the method may further comprise setting the deadline interval to be half (or less than half) of the associated radio access delay budget such that a packet arriving at the end of a deadline interval can be retransmitted in a subsequent deadline interval without exceeding the associated radio access delay budget.

The translating may be performed based on at least one predefined table.

In the above described second method, the at least one cell-level resource requirement may comprise at least one of a required interval ($D_i$) for that slice instance (e.g. a deadline interval) and a number ($N_i$) of communication resources required in the interval for that slice instance (e.g. the required guaranteed number of communication resources per deadline interval).

The first or the second method may further comprise: calculating a quota ($q_i$) of communication resources for each of the plurality of slice instances for a current transmission time interval (TTI); and allocating respective communication resources to each of the plurality of slice instances not exceeding the quota for that slice instance. In this case, the method may further comprise: obtaining information identifying a respective number ($n_i$) of communication resources allocated to at least one slice instance in at least one previous TTI; and calculating, for the current TTI, the quota for the at least one slice instance based on the obtained information.

The method may further comprise performing a replenishing procedure in which when the quota for a given slice instance in a current TTI is exhausted for a slice instance before the required interval ($D_i$) for that slice instance has expired, an additional quota of communication resources is allocated to that slice instance and the deadline for that slice instance is extended.

The method may further comprise performing an overriding procedure in which traffic of a given slice instance is prioritised over scheduled traffic of at least one other slice instance having an earlier deadline (e.g. based on traffic type).

The method may further comprise: determining, for each slice instance, a distance ($d_i$) to the deadline for that slice instance (e.g. the number of TTIs from the current TTI to the TTI that includes the deadline); and assigning, to each slice instance, a respective priority based on the distance ($d_i$) for that slice instance, wherein the lowest distance is given the highest priority and the highest distance is given the lowest priority; wherein the allocation of communication resources to the plurality of slice instances is carried out in decreasing order of priority, starting from the slice instance having the highest priority.

The method may further comprise obtaining, for at least one slice instance, at least one of: information identifying a transmit buffer status for that at least one slice instance in current TTI (e.g. whether or not there is data to be transmitted for that at least one slice instance); information identifying a transmit buffer status for that at least one slice instance in an immediately preceding TTI; and information indicating whether a deadline interval for that at least one slice instance is ongoing. In this case, the method may further comprise setting, for the at least one slice instance, the current TTI as the start of an associated deadline interval based on at least one of: the information identifying the transmit buffer status for that at least one slice instance in current TTI; the information identifying a transmit buffer status for that at least one slice instance in an immediately preceding TTI; and the information indicating whether a deadline interval for that at least one slice instance is ongoing.

The current TTI may be set as the start of an associated deadline interval for at least one slice instance if: i) a transmit buffer associated with that at least one slice instance is not empty in the current TTI and a previous deadline interval for that at least one slice instance ended in the immediately preceding TTI; or ii) a transmit buffer associated with that at least one slice instance is not empty in the current TTI and there is no ongoing deadline interval; or iii) there is an ongoing deadline interval with non-zero unspent quota and a transmit buffer associated with that at least one slice instance is not empty in the current TTI and a transmit buffer associated with that at least one slice instance was empty in an immediately preceding TTI.

The method may further comprise: obtaining information identifying at least one of: an average usage for at least one slice instance; a historical usage behaviour for at least one slice instance; a traffic pattern for at least one slice instance; and information indicating slice inactivity for at least one slice instance (e.g. in at least one preceding TTI); and calculating (e.g. at the start of an associated deadline interval) an overall quota ($Q_i$) for the interval associated with the at least one slice instance based on the obtained information.

[Math. 15]

The method may further comprise calculating an overall quota ($Q_i$) for the required interval ($D_i$) associated with the at least one slice instance based on at least one formula. For example, in the TTI in which an associated deadline interval starts, the overall quota ($Q_i$) for the interval associated with the at least one slice instance may be set to $$\min\left(N_i, Q_i - n_i + \left\lfloor N_i \frac{D_i - d_i}{D_i} \right\rfloor\right),$$

wherein: $N_i$ is the number of communication resources (e.g. PRBs) required in a deadline interval $D_i$ for slice instance i; $Q_i$ is the overall quota for the previous deadline interval $D_i$; $n_i$ is a sum of all communication resources allocated to slice instance i in previous deadline interval $D_i$; di is a distance to the previous deadline for slice instance i; and $\lfloor \ \rfloor$ is a flooring function.

The method may further comprise monitoring whether the at least one cell-level resource requirement (e.g. a delay budget violation ratio requirement and/or a throughput requirement) associated with a particular slice instance is met in a given interval; and providing information for (re)configuring in a subsequent interval, at least one of: a translation processing, from at least one network-level performance requirement associated with that slice instance, to at least one cell-level resource requirement; and a slice admission processing.

The interval may be a slice specific interval. The communication resources may comprise Physical Resource Blocks (PRBs).

The allocating may comprises: allocating, for guaranteed services, communication resources to the slice instances in order of their respective deadlines, starting from the slice instance having the earliest deadline; and allocating, for non-guaranteed services, any unused resources left by guaranteed services based on a first-come-first-served basis at packet level or based on a relative priority.

Examples of MTC Applications

It will be appreciated that each communication device may support one or more MTC applications and/or the like. Some examples of MTC applications (also referred to as 'IoT applications') are listed in the following table (source: 3GPP TS 22.368 V13.1.0, Annex B, the contents of which is incorporated herein by reference). This list is not exhaustive and is intended to be indicative of the scope of machine-type communication applications.

TABLE 5

| Service Area | MTC applications |
| --- | --- |
| Security | Surveillance systems |
|  | Backup for landline |
|  | Control of physical access (e.g. to buildings) |
|  | Car/driver security |

TABLE 5-continued

| Service Area | MTC applications |
| --- | --- |
| Tracking & Tracing | Fleet Management |
|  | Order Management |
|  | Pay as you drive |
|  | Asset Tracking |
|  | Navigation |
|  | Traffic information |
|  | Road tolling |
|  | Road traffic optimisation/steering |
| Payment | Point of sales |
|  | Vending machines |
|  | Gaming machines |
| Health | Monitoring vital signs |
|  | Supporting the aged or handicapped |
|  | Web Access Telemedicine points |
|  | Remote diagnostics |
| Remote Maintenance/Control | Sensors |
|  | Lighting |
|  | Pumps |
|  | Valves |
|  | Elevator control |
|  | Vending machine control |
|  | Vehicle diagnostics |
| Metering | Power |
|  | Gas |
|  | Water |
|  | Heating |
|  | Grid control |
|  | Industrial metering |
| Consumer Devices | Digital photo frame |
|  | Digital camera |
|  | eBook |

Various other modifications will be apparent to those skilled in the art and will not be described in further detail here.

REFERENCES

[1] ITU-R, IMT Vision—Framework and overall objectives of the future development of IMT for 2020 and beyond, Recommendation ITU-R M.2083-0, September 2015

[2] 3GPP TR 28.801 V15.1.0, Study on management and orchestration of network slicing for next generation network

[3] R. Kokku, R. Mahindra, H. Zhang, and S. Rangarajan, "NVS: A virtualization substrate for WiMAX Networks," in Proc. of ACM Mobile Comp. and Netw. (Mobicom), Chicago, USA, September 2010

[4] T. Guo, and R. Arnott, "Active LTE RAN Sharing with Partial Resource Reservation", in Proc. of IEEE Veh. Tech. Conf. (VTC), Las Vegas, USA, September 2013

[5] 3GPP TR 38.802 V14.2.0, Study on New Radio Access Technology Physical Layer Aspects

[6] https://www.kernel.org/doc/Documentation/scheduler/sched-deadline.txt

[7] J. A. Stankovic, M. Spuri, K. Ramamritham, and G. C. Buttazzo, "Fundamentals of EDF scheduling", in: Deadline Scheduling for Real-Time Systems, vol. 460, pp. 27-65, Springer, 1998

[8] L. Abeni, and G. Buttazzo, "Integrating multimedia applications in hard real-time systems", in Proc. of IEEE Real-Time Sys. Symp. (RTSS), Madrid, Spain, December 1998

[9] 3GPP TR 36.814 V9.2.0, Further advancements for E-UTRA physical layer aspects (Release 9)

The invention claimed is:

1. A method performed by network apparatus for a communication network in which communication resources are dynamically partitioned into a plurality of slices, each slice having at least one associated network-level performance requirement, the method comprising:
receiving a request comprising information from which at least one network-level performance requirement can be identified for a slice instance to which the request relates;
translating, from the at least one network-level performance requirement for the slice instance, to at least one associated cell-level resource requirement;
determining whether to admit the slice instance based on the at least one cell-level resource requirement translated from the associated at least one network-level performance requirement; and
when the determination is to admit the slice instance, providing, to a scheduler function, information identifying at least one cell-level resource requirement for the slice instance to be admitted.

2. The method according to claim 1, further comprising obtaining information identifying whether the at least one cell-level resource requirement associated with the admitted slice instance is met in a given interval and (re)configuring at least one of said translating and said determining for a subsequent interval.

3. The method according to claim 2, wherein said (re)configuring comprises at least one of: increasing an amount of resources allocated to the slice instance in a cell serving the slice instance; and reducing a number of slice instances that can be admitted concurrently.

4. The method according to claim 1, further comprising:
obtaining information identifying an average and/or historical usage behaviour associated with the slice instance to which the request relates: and
translating, from the at least one network-level performance requirement for the slice instance, to at least one associated cell-level resource requirement based on the obtained information identifying an average and/or historical usage.

5. The method according to claim 1, wherein the at least one cell-level resource requirement comprises a number of communication resources required in a given interval.

6. The method according to claim 1, wherein the communication resources comprise Physical Resource Blocks (PRBs).

7. The method according to claim 1, wherein a particular network-level performance requirement associated with a particular slice instance is based on a Service Level Agreement (SLA) associated with that slice instance.

8. The method according to claim 1, wherein the at least one network-level performance requirement is associated with at least one of the following service categories: guaranteed services, non-guaranteed services; voice calls; video calls; text/multimedia messaging; social networking; cloud services; mobile broadband; Enhanced Mobile Broadband (eMBB); Ultra-Reliable and Low-Latency Communications (uRLLC); and Massive Machine Type Communications (mMTC); and
wherein the slice request comprises information identifying at least one service category for the slice instance to which the request relates.

9. The method according to claim 1, wherein the at least one network-level performance requirement comprises at least one of the following: a reliability requirement, a guaranteed latency requirement, a guaranteed throughput requirement, and a guaranteed fraction of resources requirement.

10. The method according to claim 1, further comprising determining, for a plurality of slice instances, a respective deadline for delivery of a data packet, based on the at least one cell-level resource requirement associated with that slice instance; and allocating communication resources to each slice instance in order of their respective deadlines, starting from the slice instance having the earliest deadline.

11. The method according to claim 1, further comprising determining a deadline interval for a particular slice instance based on at least on of: a slice radio access delay budget representing an allowed duration from the time a packet arrives at a Radio Access Network (RAN) portion of the communication network to the time the packet is successfully received by an item of User Equipment (UE) associated with that slice instance; a Hybrid Automatic Repeat Request (HARQ) latency; and a processing delay.

12. The method according to claim 11, further comprising setting the deadline interval to be half (or less than half) of the associated radio access delay budget such that a packet arriving at the end of a deadline interval can be retransmitted in a subsequent deadline interval without exceeding the associated radio access delay budget.

13. The method according to claim 1, wherein said translating is performed based on at least one predefined table.

14. A method performed by network apparatus for a communication network in which communication resources are dynamically partitioned into a plurality of slices, the method comprising:
determining, for each of a plurality of slice instances, a respective deadline for delivery of a data packet, based on at least one cell-level resource requirement associated with that slice instance, wherein the at least one cell-level resource requirement is based on at least one network-level performance requirement associated with that slice instance; and
allocating communication resources to the slice instances in order of their respective deadlines, starting from the slice instance having the earliest deadline.

15. The method according to claim 14, wherein the at least one cell-level resource requirement comprises at least one of a required interval ($D_i$) for that slice instance (e.g. a deadline interval) and a number ($N_i$) of communication resources required in the interval for that slice instance.

16. The method according to claim 14, further comprising:
calculating a quota ($q_i$) of communication resources for each of the plurality of slice instances for a current transmission time interval (TTI); and
allocating respective communication resources to each of the plurality of slice instances not exceeding the quota for that slice instance.

17. The method according to claim 16, further comprising:
obtaining information identifying a respective number ($n_i$) of communication resources allocated to at least one slice instance in at least one previous TTI; and
calculating, for the current TTI, the quota for the at least one slice instance based on the obtained information.

18. The method according to claim 16, further comprising performing a replenishing procedure in which when the quota for a given slice instance in a current TTI is exhausted for a slice instance before the required interval ($D_i$) for that slice instance has expired, an additional quota of communication resources is allocated to that slice instance and the deadline for that slice instance is extended.

19. The method according to claim 16, further comprising performing an overriding procedure in which traffic of a given slice instance is prioritised over scheduled traffic of at least one other slice instance having an earlier deadline (e.g. based on traffic type).

20. The method according to claim 14, further comprising:
   determining, for each slice instance, a distance ($d_i$) to the deadline for that slice instance; and
   assigning, to each slice instance, a respective priority based on the distance ($d_i$) for that slice instance, wherein the lowest distance is given the highest priority and the highest distance is given the lowest priority;
   wherein the allocation of communication resources to the plurality of slice instances is carried out in decreasing order of priority, starting from the slice instance having the highest priority.

21. The method according to claim 14, further comprising obtaining, for at least one slice instance, at least one of: information identifying a transmit buffer status for that at least one slice instance in current TTI; information identifying a transmit buffer status for that at least one slice instance in an immediately preceding TTI; and information indicating whether a deadline interval for that at least one slice instance is ongoing.

22. The method according to claim 21, further comprising setting, for the at least one slice instance, the current TTI as the start of an associated deadline interval based on at least one of: the information identifying the transmit buffer status for that at least one slice instance in current TTI; the information identifying a transmit buffer status for that at least one slice instance in an immediately preceding TTI; and the information indicating whether a deadline interval for that at least one slice instance is ongoing.

23. The method according to claim 21, wherein the current TTI is set as the start of an associated deadline interval for at least one slice instance if:
   i) a transmit buffer associated with that at least one slice instance is not empty in the current TTI and a previous deadline interval for that at least one slice instance ended in the immediately preceding TTI; or
   ii) a transmit buffer associated with that at least one slice instance is not empty in the current TTI and there is no ongoing deadline interval; or
   iii) there is an ongoing deadline interval with non-zero unspent quota and a transmit buffer associated with that at least one slice instance is not empty in the current TTI and a transmit buffer associated with that at least one slice instance was empty in an immediately preceding TTI.

24. The method according to claim 14, further comprising:
   obtaining information identifying at least one of: an average usage for at least one slice instance; a historical usage behaviour for at least one slice instance; a traffic pattern for at least one slice instance; and information indicating slice inactivity for at least one slice instance; and
   calculating an overall quota ($Q_i$) for the interval associated with the at least one slice instance based on the obtained information.

25. The method according to claim 14, further comprising calculating an overall quota ($Q_i$) for the required interval ($D_i$) associated with the at least one slice instance based on at least one formula.

26. The method according to claim 25, wherein, in the TTI in which an associated deadline interval starts, the overall quota ($Q_i$) for the interval associated with the at least one slice instance is set to:

$$\min\left(N_i, Q_i - n_i + \left\lfloor N_i \frac{D_i - d_i}{D_i} \right\rfloor\right), \quad \text{[Math. 1]}$$

wherein: $N_i$ is the number of communication resources (e.g. PRBs) required in a deadline interval $D_i$ for slice instance i; $Q_i$ is the overall quota for the previous deadline interval $D_i$; $n_i$ is a sum of all communication resources allocated to slice instance i in previous deadline interval $D_i$; $d_i$ is a distance to the previous deadline for slice instance i; and $\lfloor \ \rfloor$ is a flooring function.

27. The method according to claim 14, further comprising monitoring whether the at least one cell-level resource requirement associated with a particular slice instance is met in a given interval; and
   providing information for (re)configuring in a subsequent interval, at least one of: a translation processing, from at least one network-level performance requirement associated with that slice instance, to at least one cell-level resource requirement; and a slice admission processing.

28. The method according to claim 14, wherein the communication resources comprise Physical Resource Blocks (PRBs).

29. The method according to claim 15, wherein the interval is a slice specific interval.

30. The method according to claim 14, wherein said allocating comprises:
   allocating, for guaranteed services, communication resources to the slice instances in order of their respective deadlines, starting from the slice instance having the earliest deadline; and
   allocating, for non-guaranteed services, any unused resources left by guaranteed services based on a first-come-first-served basis at packet level or based on a relative priority.

31. A network apparatus for a communication network in which communication resources are dynamically partitioned into a plurality of slices, each slice having at least one associated network-level performance requirement, the network apparatus is configured:
   to receive a request comprising information from which at least one network-level performance requirement can be identified for a slice instance to which the request relates;
   to translate, from the at least one network-level performance requirement for the slice instance, to at least one associated cell-level resource requirement;
   to determine whether to admit the slice instance based on the at least one cell-level resource requirement translated from the associated at least one network-level performance requirement; and
   to provide, to a scheduler function when the determination is to admit the slice instance, information identifying at least one cell-level resource requirement for the slice instance to be admitted.

32. A network apparatus for a communication network in which communication resources are dynamically partitioned into a plurality of slices, the network apparatus is configured:

to determine, for each of a plurality of slice instances, a respective deadline for delivery of a data packet, based on at least one cell-level resource requirement associated with that slice instance, wherein the at least one cell-level resource requirement is based on at least one network-level performance requirement associated with that slice instance; and to allocate communication resources to the slice instances in order of their respective deadlines, starting from the slice instance having the earliest deadline.

* * * * *